(12) United States Patent
Valerio

(10) Patent No.: US 8,201,692 B2
(45) Date of Patent: Jun. 19, 2012

(54) MATERIALS SEPARATION MODULE

(75) Inventor: Thomas A. Valerio, Atlanta, GA (US)

(73) Assignee: Thomas A Valerio, New Port Richey, FL (US)

( * ) Notice: Subject to any disclaimer, the term of this patent is extended or adjusted under 35 U.S.C. 154(b) by 24 days.

(21) Appl. No.: 12/619,255

(22) Filed: Nov. 16, 2009

(65) Prior Publication Data

US 2010/0051514 A1  Mar. 4, 2010

Related U.S. Application Data

(62) Division of application No. 11/586,309, filed on Oct. 24, 2006, now abandoned.

(60) Provisional application No. 60/777,868, filed on Mar. 1, 2006, provisional application No. 60/729,966, filed on Oct. 24, 2005.

(51) Int. Cl.
*B07C 5/00* (2006.01)

(52) U.S. Cl. ........ 209/12.1; 209/3.2; 209/552; 209/556; 209/571; 209/576

(58) Field of Classification Search .................. 209/3.2, 209/12.1, 522, 523, 556, 571, 576
See application file for complete search history.

(56) References Cited

U.S. PATENT DOCUMENTS

| | | | |
|---|---|---|---|
| 2,587,686 A | 3/1952 | Robert | |
| 3,448,778 A | 6/1969 | Ramsay | |
| 3,490,702 A | 1/1970 | Dore | |
| 3,568,839 A | 3/1971 | Dunlea | |
| 3,588,686 A | 6/1971 | Lingmann et al. | |
| 3,670,969 A | 6/1972 | Terada | |
| 3,701,419 A | 10/1972 | Hutter et al. | |
| 3,702,133 A | 11/1972 | Vibert et al. | |
| 3,702,682 A | 11/1972 | Williams | |
| 3,905,556 A | 9/1975 | Drage | |
| 3,975,263 A | 8/1976 | Elo | |

(Continued)

FOREIGN PATENT DOCUMENTS

DE  4306781  9/1994

(Continued)

OTHER PUBLICATIONS

Hottenstein. Beyond Density. Recycling Today [online]. Nov. 18, 2008, http://www.recyclingtoday.com/Article.aspx?article_id=21468.

(Continued)

*Primary Examiner* — Terrell Matthews
(74) *Attorney, Agent, or Firm* — King & Spalding

(57) ABSTRACT

An automated system for sorting dissimilar materials, and in particular for sorting plastics from other materials and for sorting different types of plastics from one another comprises, depending upon the embodiment, combinations of a sizing mechanism, a friction separation, an air separator, a magnetic separator, a dielectric sensor sortation bed, shaker screening, a ballistic separator, an inductive sensor sortation system and a float/sink tank. The dielectric sensor sortation system may be either analog or digital, depending upon the particular implementation. One or more float/sink tanks can be used, depending upon the embodiment, each with a media of a different specific gravity. The media may be water, or water plus a compound such as calcium chloride. In addition, multiples of the same general type of module can be used for particular configurations. A heavy media system or a sand float process can be used either alternatively or additionally.

20 Claims, 13 Drawing Sheets

U.S. PATENT DOCUMENTS

| | | | |
|---|---|---|---|
| 4,317,521 A | | 3/1982 | Clark |
| 4,362,276 A | | 12/1982 | Morey |
| 4,387,019 A | * | 6/1983 | Dale et al. .................. 44/605 |
| 4,405,451 A | | 9/1983 | Roman |
| 4,541,530 A | | 9/1985 | Kenny et al. |
| 4,557,386 A | | 12/1985 | Buckley et al. |
| 4,563,644 A | | 1/1986 | Lenander et al. |
| 4,576,286 A | | 3/1986 | Buckley et al. |
| 4,597,487 A | | 7/1986 | Crosby |
| 4,718,559 A | | 1/1988 | Kenny et al. |
| 4,724,384 A | | 2/1988 | Castovilly et al. |
| 4,848,590 A | | 7/1989 | Kelly |
| 4,851,110 A | | 7/1989 | Rolle et al. |
| 4,933,075 A | | 6/1990 | Nordin |
| 4,940,187 A | * | 7/1990 | Lee ............................ 241/79.1 |
| 4,986,410 A | | 1/1991 | Shield |
| 5,000,390 A | | 3/1991 | Marrs |
| 5,022,985 A | | 6/1991 | Nugent |
| 5,025,929 A | | 6/1991 | Carrera |
| 5,139,150 A | | 8/1992 | Fuller |
| 5,148,993 A | * | 9/1992 | Kashiwagi ................... 241/19 |
| 5,169,073 A | | 12/1992 | Marabini |
| 5,209,355 A | | 5/1993 | Mindermann |
| 5,260,576 A | | 11/1993 | Sommer |
| 5,273,166 A | | 12/1993 | Sawamura |
| 5,314,071 A | | 5/1994 | Christian |
| 5,314,072 A | * | 5/1994 | Frankel et al. ............... 209/44.1 |
| 5,335,791 A | | 8/1994 | Eason |
| 5,341,935 A | | 8/1994 | Djerf et al. |
| 5,344,025 A | | 9/1994 | Tyler et al. |
| 5,344,026 A | | 9/1994 | Booth et al. |
| 5,361,909 A | * | 11/1994 | Gemmer ....................... 209/12.1 |
| 5,413,222 A | | 5/1995 | Holder |
| 5,433,157 A | | 7/1995 | Dittmann et al. |
| 5,443,157 A | | 8/1995 | Baker et al. |
| 5,443,164 A | * | 8/1995 | Walsh et al. .................. 209/580 |
| 5,465,847 A | * | 11/1995 | Gilmore ....................... 209/12.1 |
| 5,468,291 A | | 11/1995 | Waterson et al. |
| 5,502,559 A | | 3/1996 | Powell et al. |
| 5,512,758 A | | 4/1996 | Kobayashi et al. |
| 5,535,891 A | * | 7/1996 | Kuniyone et al. ............ 209/12.1 |
| 5,548,214 A | | 8/1996 | Yasohama |
| 5,555,324 A | | 9/1996 | Waxman et al. |
| 5,555,984 A | | 9/1996 | Sommer |
| 5,562,743 A | | 10/1996 | Daugherty |
| 5,611,493 A | | 3/1997 | Hayashi et al. |
| 5,624,525 A | | 4/1997 | Ehara |
| 5,628,409 A | | 5/1997 | Thomas |
| 5,632,381 A | | 5/1997 | Thust et al. |
| 5,667,151 A | * | 9/1997 | Miura et al. ................. 241/20 |
| 5,675,416 A | * | 10/1997 | Campbell et al. ............. 356/367 |
| 5,678,775 A | | 10/1997 | Chapman |
| 5,739,524 A | | 4/1998 | Fally |
| 5,791,489 A | | 8/1998 | Leifeld |
| 5,801,530 A | | 9/1998 | Crosby |
| 5,829,600 A | | 11/1998 | Jordan et al. |
| 5,829,694 A | | 11/1998 | Chapman |
| 5,966,217 A | * | 10/1999 | Roe et al. .................... 356/402 |
| 6,100,488 A | | 8/2000 | Satake et al. |
| 6,112,903 A | | 9/2000 | Kimmel |
| 6,124,560 A | | 9/2000 | Roos |
| 6,144,004 A | | 11/2000 | Doak |
| 6,191,580 B1 | | 2/2001 | Guichard |
| 6,199,779 B1 | | 3/2001 | Mosher |
| 6,313,422 B1 | | 11/2001 | Anibas |
| 6,319,389 B1 | | 11/2001 | Fountain et al. |
| 6,420,866 B1 | | 7/2002 | Goldberg et al. |
| 6,452,396 B2 | | 9/2002 | Ott |
| 6,497,324 B1 | * | 12/2002 | Doak et al. ................... 209/522 |
| 6,568,612 B1 | | 5/2003 | Aoki |
| 6,669,839 B2 | | 12/2003 | Tipton et al. |
| 6,696,655 B2 | | 2/2004 | Harbeck et al. |
| 6,838,886 B2 | | 1/2005 | Hilliard |
| 6,914,678 B1 | | 7/2005 | Ulrichsen et al. |
| 6,984,767 B2 | | 1/2006 | Hunt |
| 7,173,411 B1 | | 2/2007 | Pond |
| 7,296,340 B2 | | 11/2007 | Sakaida et al. |
| 7,351,376 B1 | | 4/2008 | Quake et al. |
| 7,351,929 B2 | | 4/2008 | Afsari et al. |
| 7,354,733 B2 | | 4/2008 | Bukshpan et al. |
| 7,449,655 B2 | | 11/2008 | Cowling |
| 7,674,994 B1 | | 3/2010 | Valerio |
| 7,786,401 B2 | | 8/2010 | Valerio |
| 2001/0045378 A1 | | 11/2001 | Charles et al. |
| 2002/0074274 A1 | | 6/2002 | Peggs |
| 2003/0052684 A1 | | 3/2003 | Nelson et al. |
| 2004/0144693 A1 | | 7/2004 | Tse |
| 2005/0080520 A1 | * | 4/2005 | Kline et al. .................. 701/1 |
| 2005/0242006 A1 | * | 11/2005 | Bohlig et al. ................. 209/659 |
| 2006/0037889 A1 | | 2/2006 | Fitch |
| 2006/0219276 A1 | | 10/2006 | Bohnert |
| 2007/0045158 A1 | | 3/2007 | Johnson |
| 2007/0084757 A1 | | 4/2007 | Jeon et al. |
| 2007/0098625 A1 | | 5/2007 | Adams |
| 2007/0187299 A1 | | 8/2007 | Valerio |
| 2007/0187305 A1 | | 8/2007 | Valerio |
| 2007/0262000 A1 | | 11/2007 | Valerio |
| 2008/0257794 A1 | | 10/2008 | Valerio |
| 2009/0067570 A1 | | 3/2009 | Paspek et al. |
| 2009/0250384 A1 | | 10/2009 | Valerio |
| 2010/0005926 A1 | | 1/2010 | Valerio |

FOREIGN PATENT DOCUMENTS

| | | |
|---|---|---|
| EP | 0332564 | 9/1989 |
| EP | 0541403 | 5/1993 |
| SU | 1039567 | 9/1983 |
| SU | 1606208 | 11/1990 |
| WO | WO 2006/131377 | 12/2006 |
| WO | WO 2009/067570 | 5/2009 |

OTHER PUBLICATIONS

Goosey et al. A Scoping Study: End-of-Life Printed Circuit Boards [online]. 2002, http://cfsd.org.uk/seeba/TD/reports/PCB_Study.pdf.

* cited by examiner

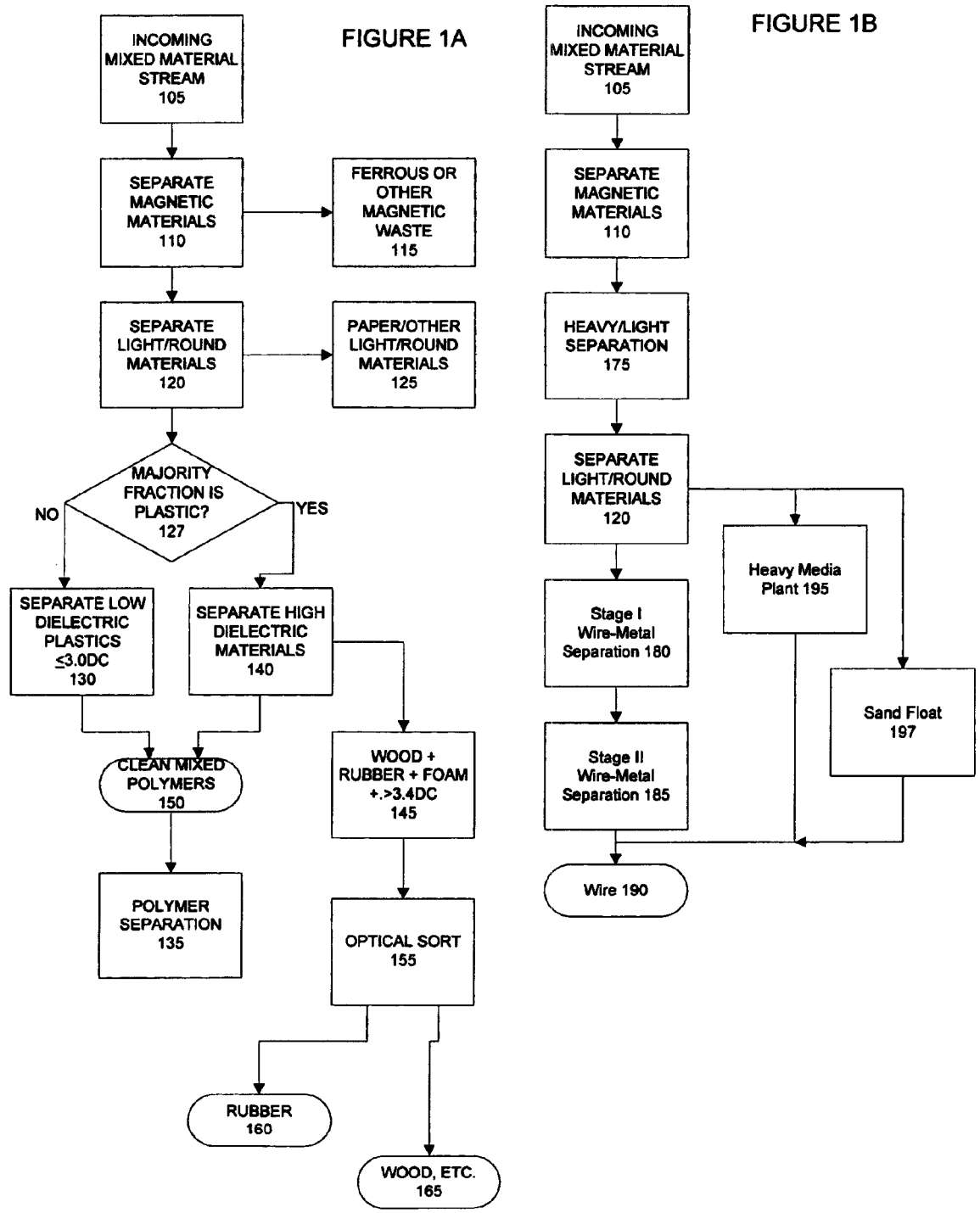

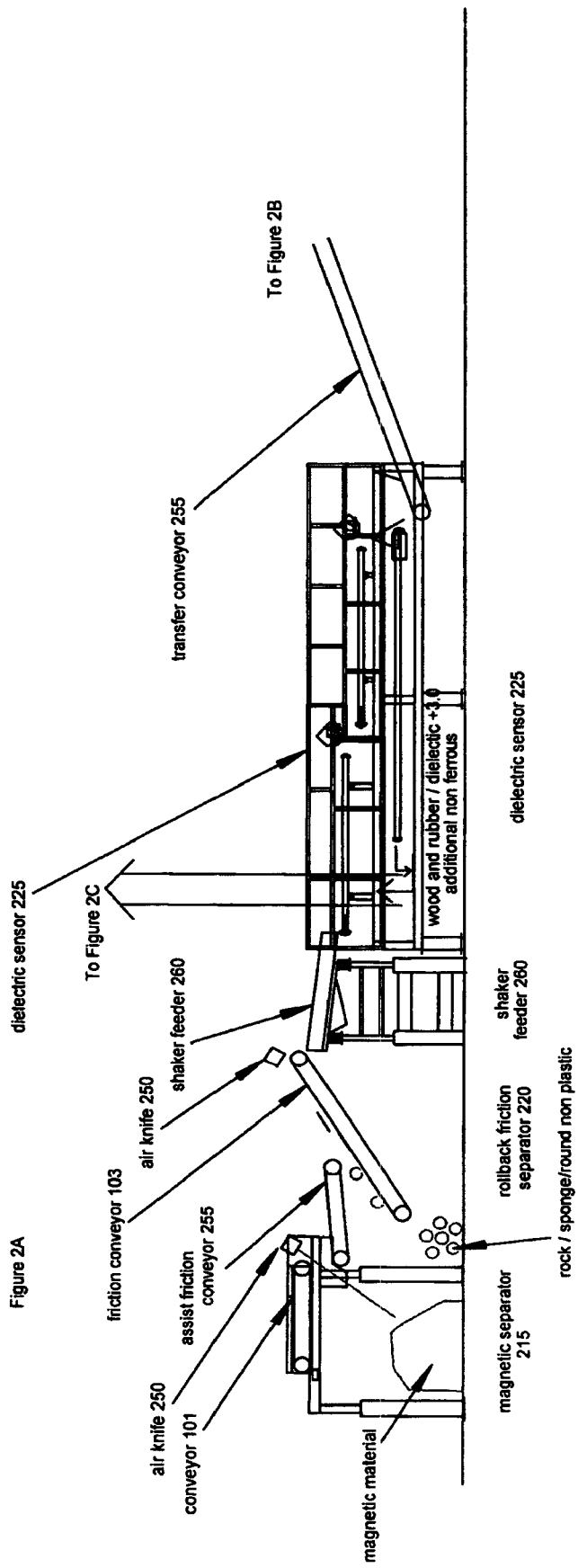

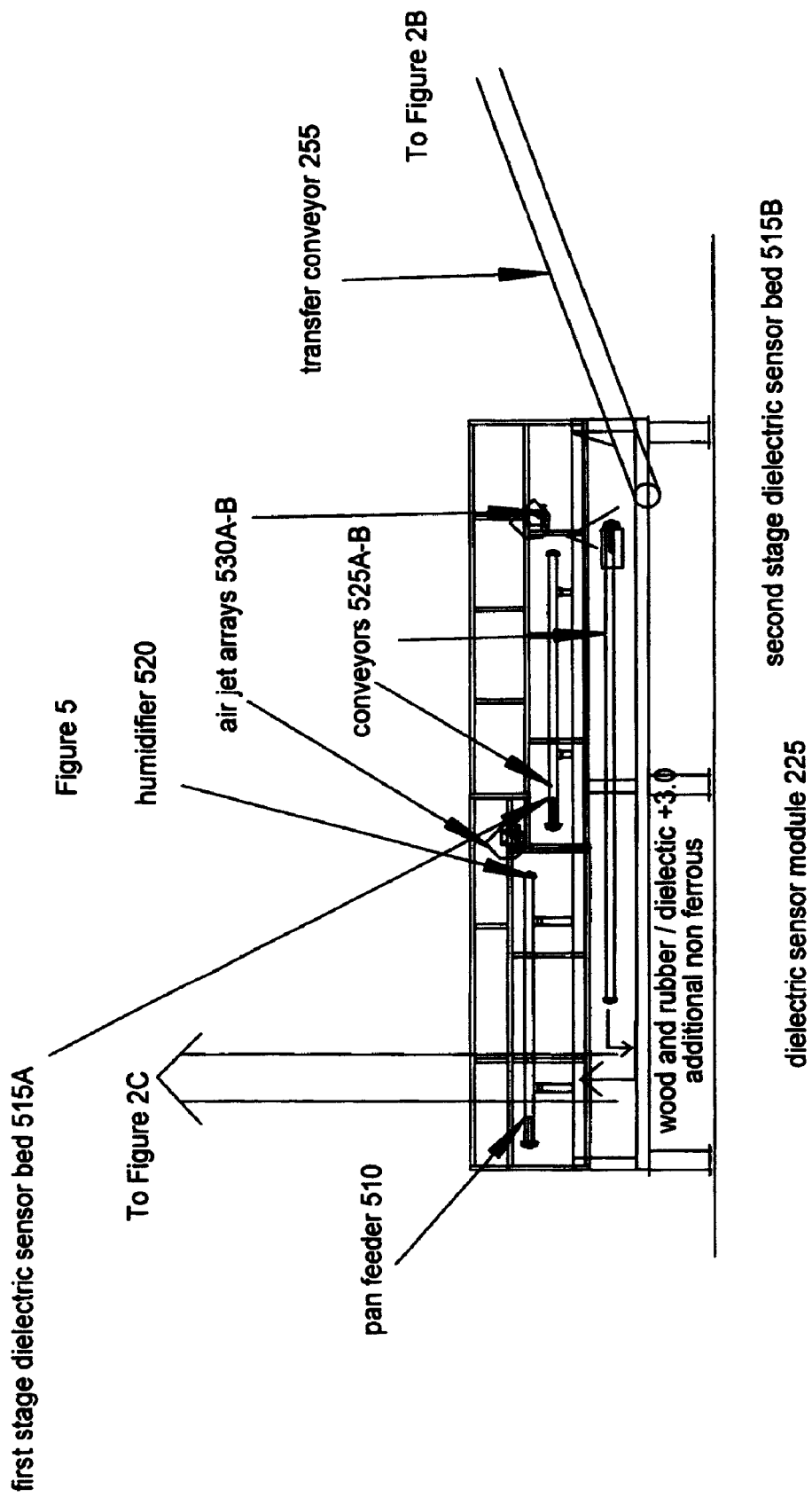

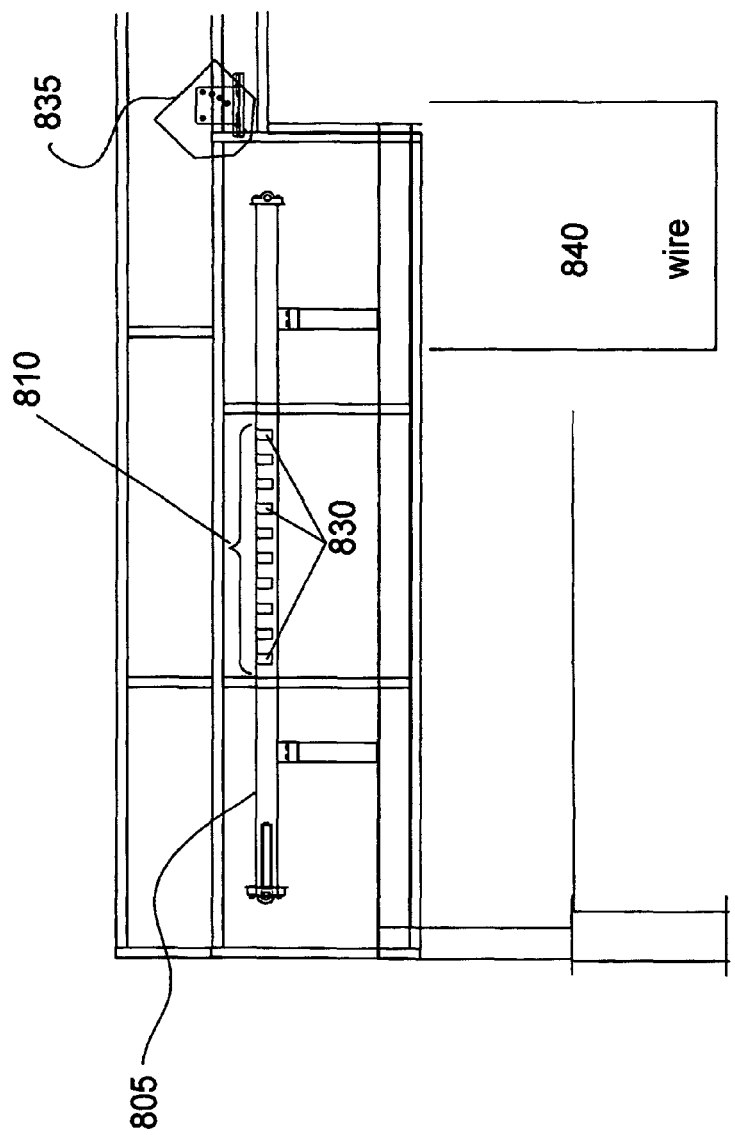

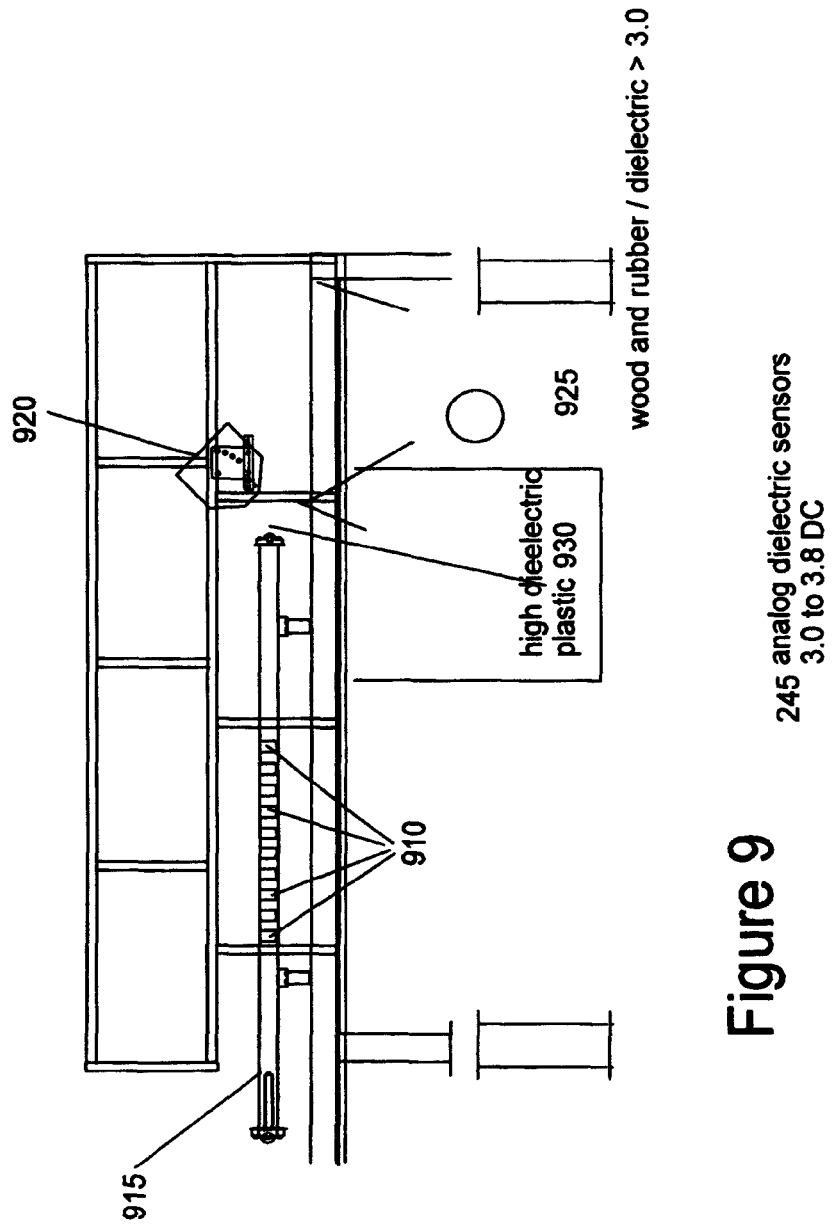

MATERIALS SEPARATION MODULE

RELATED PATENT APPLICATIONS

This non-provisional patent application is a divisional of U.S. patent application Ser. No. 11/586,309, entitled "Dissimilar Materials Sorting Process, System and Apparata," filed on Oct. 24, 2006 now abandoned, which claims priority under 35 U.S.C. §119 to U.S. Provisional Patent Application Nos. 60/777,868, entitled "Method and Apparatus for Sporting," filed on Mar. 1, 2006, and 60/729,966, entitled "Method and Apparatus for Sorting Dissimilar Materials," filed on Oct. 24, 2005, as well as priority under 35 U.S.C. §120 to: (a) U.S. patent application Ser. No. 11/255,850, entitled "Method and Apparatus for Sorting Metal," filed on Oct. 21, 2005, which claims priority under 35 U.S.C. §119 to U.S. Provisional Patent Application No. 60/621,125, entitled "Method and Apparatus for Sorting Metal Pieces," filed on Oct. 21, 2004; and (b) U.S. patent application Ser. No. 11/584,196, entitled "Method and Apparatus for Sorting Contaminated Glass," filed on Oct. 20, 2006, which claims priority under 35 U.S.C. §119 to U.S. Provisional Patent Application No. 60/728,581, entitled "Method and Apparatus for Sorting Contaminated Glass," filed on Oct. 20, 2005. Each of the foregoing priority and related applications is hereby fully incorporated herein by reference.

TECHNICAL FIELD

The present invention relates generally to materials sorting processes and systems, and more particularly relates to processes, systems, apparata and techniques for sorting dissimilar materials such as for the purpose of recycling some or all of such materials.

BACKGROUND

Recycling of waste materials is highly desirable from many viewpoints, not the least of which are financial and ecological. Properly sorted recyclable materials can often be sold for significant revenue. Many of the more valuable recyclable materials do not biodegrade within a short period, and so their recycling significantly reduces the strain on local landfills.

However, in many instances there has been no cost-effective method for achieving the necessary sorting. This has been particularly true for, for example, non-ferrous materials, and particularly for non-metallics such as high density plastics. For example, one approach to recycling plastics has been to station a number of laborers along a sorting line, each of whom manually sorts through shredded waste and manually selects the desired recyclables from the sorting line. This approach is not sustainable in most economics since the labor component is too high.

While ferrous recycling has been automated for some time, mainly through the use of magnets, this technique plainly is ineffective for sorting non-ferrous materials.

As a result, there has been a need for a cost-effective, efficient process, system and apparata for sorting dissimilar materials, including plastics, in a manner which facilitates significant revenue recovery while also significantly reducing landfill.

SUMMARY

Recyclable wood, rubber, metal, wire and plastics account for a significant share of the solid waste generated. It is highly desirable to avoid disposing of wood, rubber, metal, wire and plastics in a landfill, and instead to recycle these materials. In order to recycle different materials from a mixed waste, the wood, rubber, metal, wire and plastics must be identified and separated. The present invention provides a process, for sorting, without human intervention, dissimilar materials such as wood, rubber, metal, wire and plastics, from a group of mixed materials where, in at least some arrangements, each such material may appear at random times or in random quantities within the mix. In addition, the present invention provides a system for executing the process, and also provides novel apparata for performing certain of the steps of the process. The exemplary arrangements discussed hereinafter include a variety of steps, or a variety of modules, and not all steps or all modules need be implemented in every embodiment of the invention. Likewise, the sequence in which various of the process steps are executed can be varied in appropriate circumstances without departing from the invention.

In one arrangement, the process comprises a sequence of sorting steps for extracting from a mixed material stream a component of that stream, or a group of related components. As each component or group is removed, the residue is passed to the next step for further processing. Once each preliminary component is removed, the remaining residue is also a desired component or group.

The system of the present invention includes a plurality of modules or stages, where each stage typically performs a different sorting function, with the result that different materials are separated out of the mix at different times, until finally each type of recyclable has been sorted out of the mix and the residue—now typically substantially smaller in volume than the original mix—may be routed for other processing or discarded.

Depending upon the particular implementation, the system of the present invention includes a plurality, though not necessarily all, of a group of apparata comprising a magnetic separator, a friction separator which may, for example, be a rollback friction separator, a dielectric sensor sortation bed, shaker screening, a ballistic separator, and an inductive sensor sortation system. The dielectric sensor sortation system may be either analog or digital, depending upon the particular implementation. An air separation module may also be provided, which may include an air knife or other system which uses air to separate a lighter fraction from a heavier fraction. In addition, multiples of the same general type of module may be used, although the specific configuration of each such module may be optimized to select somewhat different elements of the mix. One or more float/sink tanks may also be implemented, by which to separate less dense materials from more dense materials, and the specific gravity of the tank media may be adjusted for each tank to permit selection of the materials intended to float versus those intended to sink. For some float/sink tanks, the media may be water, or water plus an additional compound, depending upon the particular materials to be sorted and the volumes to be handled. Alternatively, a heavy media plant can be used. If a dry process is preferred, a sand float tank can be used.

Depending upon the implementation, various types of dielectric sensors and sensor array configurations can be used in the inventive sorting system. Typically, each of the sensor arrays includes a number of proximity sensors placed in a pattern across the path of the mixed materials. The sensors can be analog or digital, shielded or unshielded, capacitive or inductive proximity sensors. Each type of sensor has specific material detection characteristics and in turn generate different signals when metal, glass, plastic, wood or rubber pieces are detected, as discussed in more detail hereinafter.

In addition, where the sorting process may be aided by ensuring a suitable moisture content, a mister or humidifier may be included in the appropriate module. While adding moisture can be helpful in some steps of the sorting process, particularly with regard to increasing the dielectric constant of absorbent materials, in other sorting steps of some embodiments an IR heat source of sufficient BTU's to 'flash' dry the materials can provide better uniformity of operation, the details of which are discussed hereinafter. Still further, in some sorting steps for certain embodiments, for example where dielectric sensors are used, the use of temperature and humidity control around the sensors can provide improved uniformity of operation.

In addition, multiple groups of modules may be configured as multiple sorting lines, for example to sort different sizes of materials. In one such arrangement, a first sorting line may sort material over a predetermined size, while another sorting line may sort material less than that predetermined size. The number of such sorting lines is not limited, and may be matched to the volume of the mix, and the type of mix, which is desired to be sorted.

BRIEF DESCRIPTION OF THE FIGURES

FIG. 1A shows a process flow diagrams of an implementation of the process of the present invention.

FIG. 1B shows a process flow diagram of an implementation of the process of the invention particularly suited to recovery of wire and metals, and shows the alternatives of a float/sink tank, a heavy media system, or a dry sand float process.

FIGS. 2A-2C, taken together, show in side elevational view a system in accordance with the present invention.

FIG. 5 shows in side elevational view a low pass dielectric sensor module in accordance with the present invention.

FIG. 8 illustrates in side elevational view an inductive sensing module in accordance with the present invention.

FIG. 9 illustrates in side elevational view a bandwidth dielectric sorting module in accordance with the present invention.

DETAILED DESCRIPTION OF EXEMPLARY EMBODIMENTS

Figure 2B:
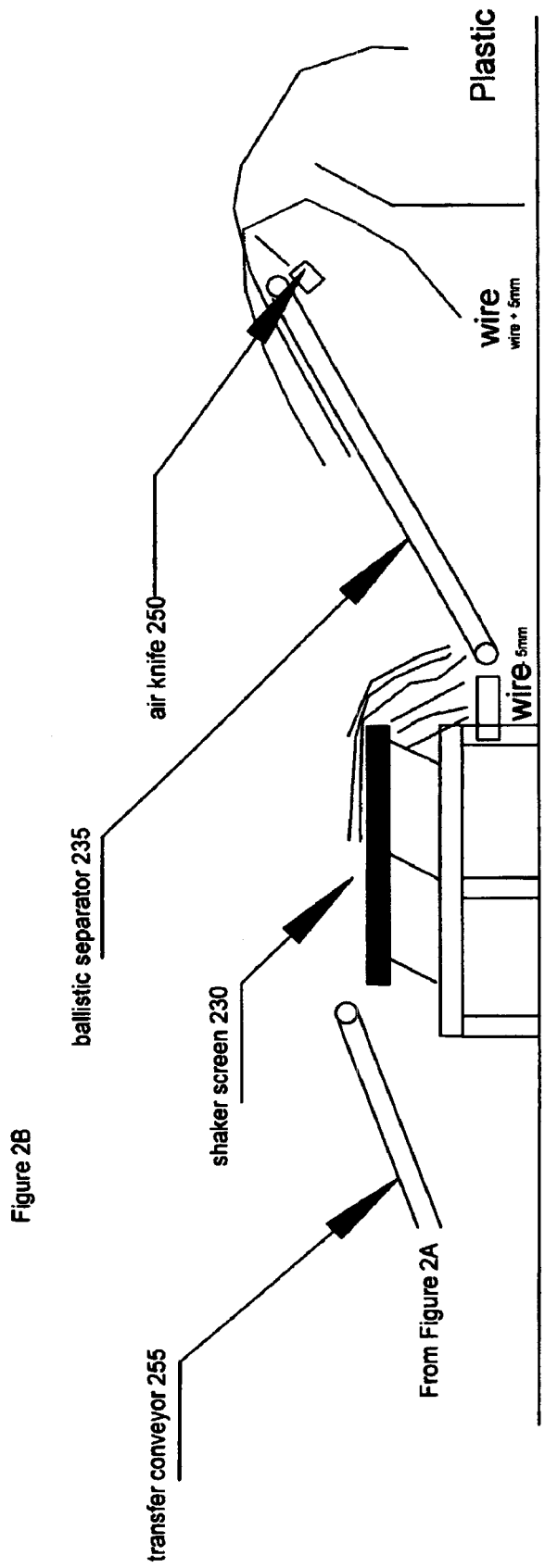

Referring first to FIG. 1A, an aspect of the process of the present invention, indicated generally at 100, may be better appreciated. As indicated at step 105, an incoming stream of mixed material typically includes wood, rubber, ferrous and non-ferrous metals, wire including insulated wire coated with a plastic cover, and a variety of types of plastic pieces, including foam, polyethylene, polystyrene, ABS, and so on.

In the illustrated embodiment, the process proceeds at step 110 by separating out the magnetic materials, which typically includes the ferrous metals such as iron and steel, as well as certain ceramics. In most instances, the valuable magnetic materials have already been removed from the stream, and so the magnetic materials remaining at this stage is mostly waste. These materials are diverted for further processing as required by the particular implementation, as shown at 115. For many streams, the further processing may be nothing more than disposal, although this will depend on the particular implementation and waste stream being sorted. An air system can also be used at this stage, either as an addition to the existing module or, in some embodiments, as a replacement. The air system comprises either an air knife or other arrangement for separating heavier and lighter fractions using blowing air. The resulting concentrated fractions will comprise, for the heavier side, wire and metals, rubbers, wood, and possibly some other dense materials including perhaps some dirt. The lighter concentrate will comprise primarily plastics, paper, some foam, and possibly other light materials.

Following the removal of the magnetic materials, the process advances to step 120, where light or round materials, such as foam and rocks, are diverted for further processing, as indicated at step 125. Again, in some instances such processing may be merely disposal.

Next, as indicated at step 127, alternative process steps 130 and 140 exist depending upon the composition of the mixed material stream. In general, although not required, it is desirable to continue processing the majority fraction of the stream, and to select the minority fraction for diversion to other processing. This can be achieved by selection based on dielectric constant, since most plastics valuable for recycling have dielectric constants on the order of 3 or less, while the other materials typically have higher dielectric constants, particularly wet materials that are absorbent, rubbers, and so on and discussed in more detail later.

Thus, if the materials stream has plastics as its minority fraction, then materials having a dielectric constant below a certain threshold are diverted for further processing as shown at step 135. These materials typically include, for example, polypropylene and polyethylene, polystyrene and ABS, as well as some waste materials. The materials having a higher dielectric typically comprise wet or moist wood, foam, rubber, and so on. In one embodiment, the threshold for a low dielectric constant can be on the order of 3.0 although the precise set point can vary significantly depending upon the materials.

Alternatively, as indicated at step 140, if the majority fraction is plastics, then materials having a dielectric constant above a predetermined threshold are separated out and diverted for further processing, as shown at step 145. These materials include different forms of wood, rubber, foam and so on. In one embodiment, the threshold for a high dielectric constant may be on the order of 3.4. It will be appreciated that, at this point, the remaining materials are only those which have are non-magnetic, suitably dense, and having a dielectric constant below a specified threshold (or, for analog sensors, a specified range.), plus a very small amount of other waste. The vast majority of this concentrate typically comprises recyclable polymers, i.e., plastics, having a relatively high value in the recycling market such as polystyrene and ABS, plus other less dense plastics.

However, other materials, typically among those diverted at steps 135 and 145, may also represent significant value as raw recyclable materials. To recover these, additional processing steps can be used. As indicated at step 155, a density separation step may be used where denser materials, such as wire, are separated out from lower density materials such as wood and rubber by the use of a float/sink tank, heavy media process, or sand float process as discussed hereinafter, particularly in connection with FIG. 1B and FIG. 10. The wire can then be collected for further processing as shown at step 160. The residue of wood, rubber and any other materials from steps 145 and 155 can then be sorted optically, as shown at step 165, such that the rubber is collected as shown at step 170, and the wood is collected as shown at step 175. It will be appreciated by those skilled in the art that not each of the foregoing steps will be required for every implementation of the inventive process, since variations may occur in the materials mix or in the economic benefit of recycling certain of the materials, in which cases those processing steps may be removed from the process.

Next referring to FIG. 1B, a process for reclaiming recyclable wire from the materials stream may be better appreciated. It will be appreciated that the process of FIG. 1B can be integrated into the embodiment shown in FIG. 1A, or can be run separately, depending upon the nature of the materials stream and the decision as to which materials should be recovered. For convenience, the major steps in the wire recovery process are shown in FIG. 1B. The materials stream is provided at step 105, as in FIG. 1A, where the materials typically have been screened to ensure a relatively uniform size, although such screening is not critical in all embodiments. The magnetic materials are then separated as shown at 110, followed by a separation of the remaining stream into heavy and light fractions as shown at step 175.

The separation into heavy and light fractions can be accomplished in several ways, for example by a ballistic conveyor with an air knife or by other air separation devices, after which the heavy fraction is provided to a rollback conveyor to remove the foam and round pieces. At this stage, two options exist. In a first option, the heavy fraction, which contains the wire and metals, is fed into one or more stages of wire-metal separation, typically involving the use of one or more float/sink tanks as shown at 180 and 185, which yields as its output a wire and metal concentrate. Although a single float/sink tank works well, increasing volumes of throughput can be achieved by using multiple float/sink tanks.

In such an arrangement, the first float/sink tank can, for example, use water as the media, which causes wood, rubber, and any remaining foam or light rubber to float while the wire, metal and some other materials sinks. A second float/sink tank can involve a media with a higher specific gravity, on the order of 1.4, which again causes the wire and metals to sink but floats nearly all materials such as plastics, paper, and so on. The result is a wire concentrate, as shown at 190, as well as a residue of plastic and other materials that may be the subject of further processing.

As a second option, shown at 195, the heavy fraction remaining after step 175 can be provided to a heavy media plant, which typically uses a media including ferrosilicates to perform the metals separation. With this option, again, the result is a wire concentrate 190.

Figure 2C:
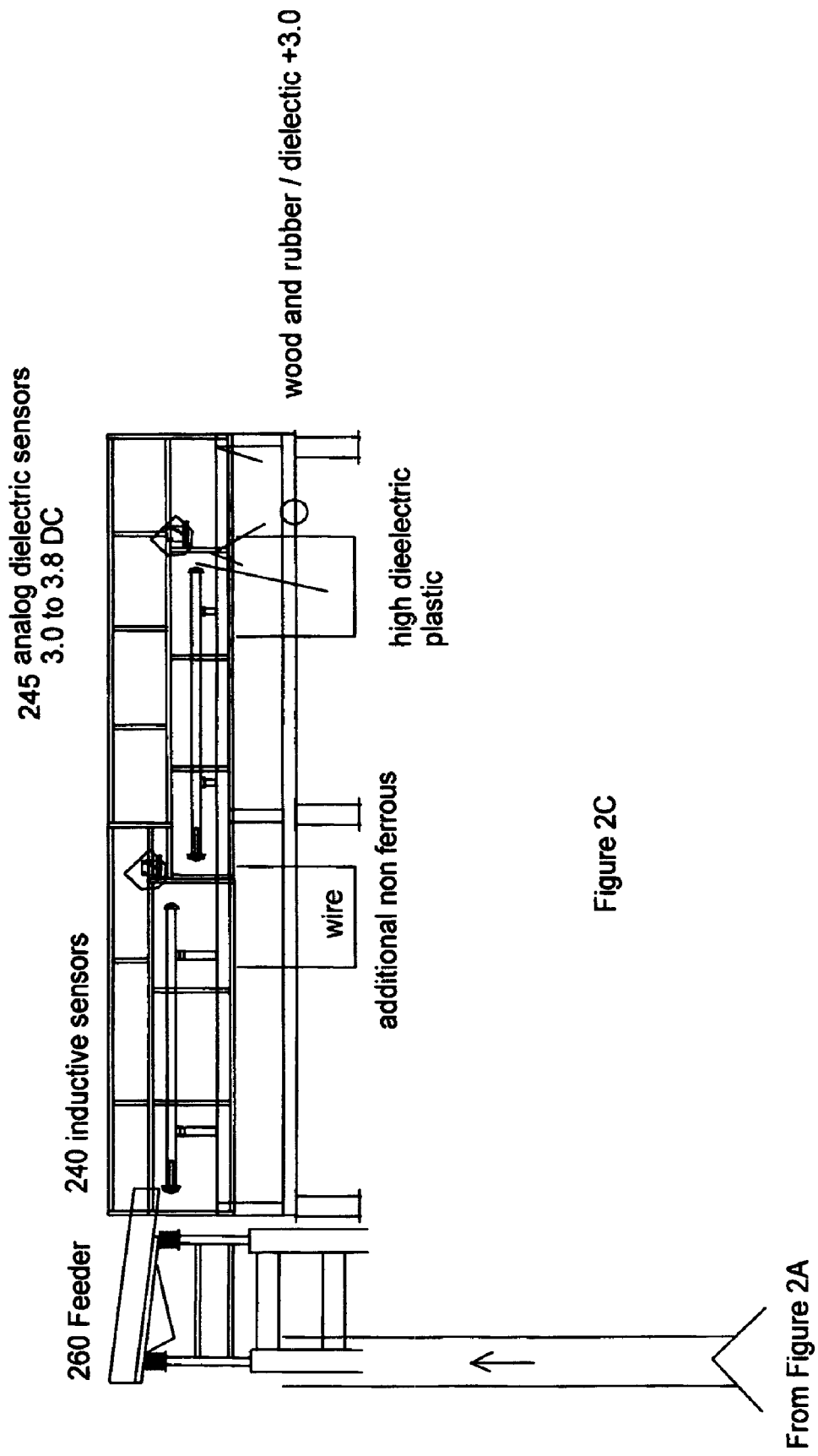

Referring next to FIGS. 2A-2C, a system which implements the process described in FIG. 1 may be better appreciated. The system, indicated generally at 200, is configured from multiple modules, each selected for inclusion in the system as appropriate for a specific material mix. Again, one typical material mix includes wood, rubber, metal, wire and a variety of types of polymeric, or plastic, pieces. These sorting modules can include a magnetic separator portion 215, a rollback separator 220, a low pass dielectric module 225, shaker screening 230, a ballistic separator 235, an inductive sensor sortation system 240, and a bandwidth dielectric module 245. The rollback separator 220 and the ballistic separator 235 can also include an air knife or other air separation module 250. The air knife or air separation module can be implemented either to move air upward or to move air downward, depending on the particular implementation. One or more transfer conveyors 255, which may be a friction conveyor or any other suitable conveyor, can be implemented to move the stream of material mix from one module to another. Likewise, a shaker feeder 260 may be implemented between modules to evenly spread the material mix for processing by the next module.

In general, the modules have the following functions, which may be better understood hereinafter in connection with the description of FIGS. 3A-9B. The magnetic separator module 215 separates magnetic materials in the material mix from non-magnetic materials. The rollback separator 20 separates round materials (e.g., foam, rubber and rocks) from irregularly shaped materials in the mix. The low pass dielectric sensor 225 separates less desirable wood, rubber and other materials that have a dielectric constant greater than a desired dielectric constant from the valuable plastics. The low pass threshold or top of the range is typically on the order of 3.0 for an exemplary embodiment although a range of at least 3-5 has been found workable, depending on the material and especially if the wood and other absorbent materials are moist or wet. The shaker screen 230 separates small pieces such as wire, but may not be required in all embodiments, including particularly embodiments which use an efficient air separation module 250. The ballistic separator 235 separates low surface area wire from higher surface area pieces such as shredded plastic on the basis of density and velocity, although this function can alternatively be performed by a float/sink tank where the media permits the wire to sink but causes the plastics and other materials to float.

In some embodiments, a separate inductive tensor sortation system 240 separates wire and other non-ferrous metals from the wood, rubber and plastic portion of the mixed materials. The bandwidth dielectric sensor 245 separates wood and rubber from remaining plastics within the desired dielectric range. Some or all of these sorting modules and other modules described in the applications incorporated by reference may be used together to sort mixed materials. Again, for embodiments which permit the wire to be effectively separated at an earlier stage, such an arrangement is not always required. Additionally, while this module permits wire to be effectively separated, the float/sink tank arrangement described hereinafter in connection with FIG. 10 can alternatively be used. In some embodiments, it may be desired to use multiple float sink tanks, with media of different specific gravity to perform different sorting.

Each of the modules described above may be better appreciated from the following discussion of FIGS. 3A-9B.

In a typical arrangement, the mixed materials to be sorted have been shredded and screened in a manner known in the art so that their physical dimensions are preferably between 1" and 5". Multiple screening steps may be used to better remove dirt as well as other waste of small size, and the fraction removed by screening may be the subject of further processing as desired. During the shredding process, the system generates heat and causes much of the water that is normally in the waste products to vaporize. If there is insufficient water in the mixed pieces being processed to sufficiently distinguish the material by known dielectric const sorted by means of a mister or humidifier or other conventional wetting device (not shown). The moisture from the humidifier is absorbed by the dry wood, foam and other absorbent materials (raising the dielectric constant) but is not absorbed by the plastic materials (causing the dielectric constant to remain virtually unchanged). By making all of the wood, foam and other absorbent materials wet rather than dry, before the sorting process, the system can more easily distinguish the wood and other materials from the plastic pieces, thereby improving the accuracy of the sorting process. This can be particularly relevant to some embodiments of the sensor beds, where maintenance of substantially constant temperature and humidity can provide more uniform performance in at least some embodiments. The fact that the pieces are of substantially uniform size also permits more uniform operation. However, it will be appreciated that such temperature and humidity control is not required for all embodiments.

Although the stream of mixed recyclable materials to be sorted may be supplied by any of a variety of sources, one typical source is an automobile/white good shredding line. These lines are well known in the art.

Figure 3B:
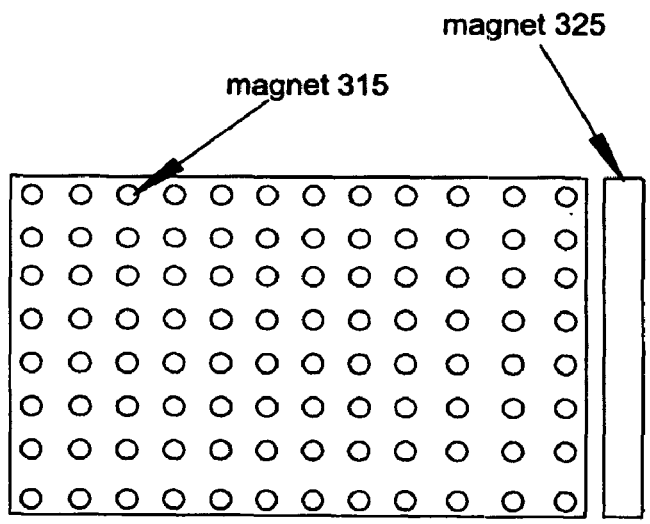
FIGS. 3A-3B show, in side elevational view and in top plan view, respectively, a magnetic sorting module in accordance with the present invention.
Figure 3A:
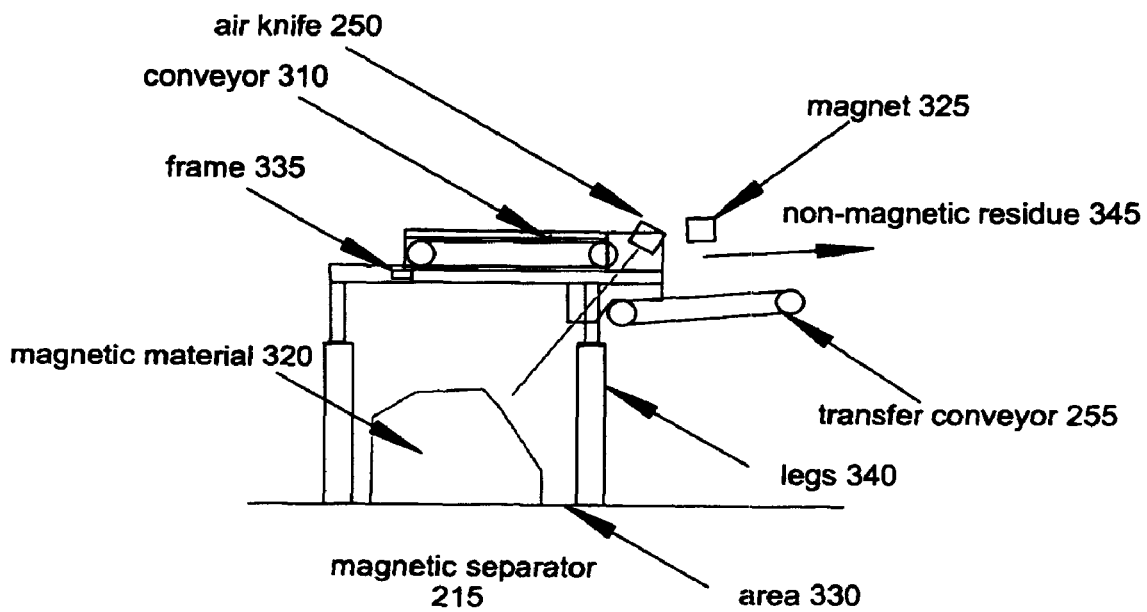

In an embodiment of the inventive system, installed in-line with the aforesaid automobile/white good nonferrous processing line, the mixed materials are first processed by the magnetic sorting module 215, shown in greater detail in FIGS. 3A-3B, which separates magnetic materials such as iron, steel and some ceramics from the mixed materials. The mixed materials, shown best in FIG. 3B, are placed on a moving conveyor belt 310 traveling at a speed that can accommodate the full volume of the processing stream from the shredder line. The conveyor belt 310 can have magnetic components 315 associated therewith or embedded therein that cause magnetic materials 320 in the mix to be attracted to the conveyor belt 310 through magnetic force. Alternatively, a magnetic field produced by permanent or electromagnets 325 can be generated at the end of the conveyor belt 310 in a manner which causes the magnetic pieces to be deflected by the magnetic field. As the conveyor belt 310 rotates downward, the magnetic metal pieces are removed and fall into a segregated area 330. In an embodiment, a light air jet or air knife 250 can be included to assist the magnet in deflecting lightly magnetic pieces into the segregated area 330. The conveyor belt 310 can be seen to be supported by a frame 335 and legs 340 in a conventional manner. While the magnetic sorting module is illustrated here as the first module, and this order is appropriate in some embodiments, it will be appreciated by those skilled in the art that this order is not critical in all embodiments, and in some embodiments (and for some types of mix) the magnetic module may be eliminated.

The non-magnetic pieces, or residue 345, are not affected by the magnetic field and pass through the magnetic sorting module to be further sorted by subsequent modules. In an embodiment, and referring now to FIGS. 4A-4B which illustrate the rollback separator module and adjacent elements of the overall system, the non-magnetic materials travel across the adjustable feed conveyor belt, or assist friction conveyor belt 255, that drops the materials onto the rollback separator module 220. The rollback separator module 220 separates rounded, comparatively heavy materials from comparatively flat or lightweight materials and comprises an adjustable pitch moving friction conveyor 410 on which can be optionally disposed a plurality of bumps 415 to assist in retaining the desired portions of the mix. The pitch of the assist friction conveyor 255 can be adjusted to control the height at the end 420 where the material drops from the feed conveyor onto the rollback separator 220. Although the conveyor belt 410 is rotating upward as shown by the arrow indicating the direction of travel, relatively rounded or heavy objects such as rocks and light, round objects such as foam, indicated at 425, roll down against the direction of belt rotation and will fall into a segregated collection area 430. In contrast, flat pieces of materials, including, plastic, wire, rubber and wood will stick to the separator 220 and are transported off the upper end of the conveyor belt 410 onto the next module. It will again be appreciated that, while the rollback friction separator module is positioned second in order in the illustrated embodiment, a different order may be appropriate in some embodiments or, depending on the mix and/or the implementation, this module can be eliminated.

As noted previously, in some embodiments the textured surface of the friction separator conveyor belt 410 can include a pattern of circular protrusions or bumps 415 that provide friction. The protrusions can be on the order of about 1% mm high and ½ mm in diameter. The space between adjacent protrusions can be on the order of about ¼ mm. The rollback separator conveyor belt 410 can be fabricated of any suitably durable material which provides friction sufficient to grip the flat mixed pieces, and for example may be made of a variety of synthetic rubber materials. The angle and speed of the assist friction conveyor belt 255 are adjustable so that the separation of materials can be fine-tuned to reduce errors in the subsequent modules including the dielectric sensor sortation module (i.e., round materials with low surface areas, such as rocks, if not consistently deflected by compressed air jets, and wet materials, such as foam, may give false dielectric readings). Similarly, the conveyor belt 410 can also be replaced with various belt materials and texture surface patterns so that the friction coefficient of the belt can be adjusted. More objects will tend to be passed through the rollback separator 220 if the angle of the belt is low, the speed is slow and the friction coefficient of the belt is high. Conversely, a high angle, fast speed and smoother belt will pass fewer pieces but may cause of loss of some of the desirable materials. If desired, an air knife 250 can also be added near the top of the belt 410 to assist in initiating the rolling off of the undesired materials. It will be appreciated that the rollback separator module is typically supported on a frame and legs similar to those shown for the magnetic separator 215. These elements are not shown in this instance for the sake of clarity.

The pieces of plastic, wire, metal, rubber and wood that adhere to the rollback separator 220 are delivered to a shaker feeder 260. The shaker feeder 260 has a substantially planar, smooth, inclined surface that vibrates to evenly distribute the materials. The shaker feeder 260 may be supported by a plurality of flexible or movable legs 435. A motor (not shown) is used to vibrate the substantially planar surface of the shaker feeder 260 that supports the flat pieces of plastic, rubber, metal and wood. The planar surface is preferably inclined so that the pieces fall off the lower end of the surface. It will be appreciated that, at this point, the residue of the mix primarily comprises non-magnetic and generally flat pieces, but still includes plastics, wire, wood, and so on.

Referring next to FIGS. 5A-5B, in one embodiment the non-magnetic and generally flat mixed materials are fed to a dielectric sensor sortation module 225, which can comprise multiple stages, arranged as a cascade in at least some embodiments, depending upon the particular material mix and the specific implementation. In an embodiment, the module can include a pan feeder 510 that vibrates to evenly spread the materials onto either a conveyor belt, a slide or other platform which allows the materials to pass over multi-stage dielectric sensor beds or arrays 515A-B (two stages are shown for simplicity).

The dielectric sensor sortation module can comprise either digital or analog dielectric sensors, or both. Although either type can be used in most embodiments, it may be desirable in at least some instances to alter the type of sensor being used according to the composition of the waste stream being sorted. As noted previously, it is generally preferable to reject the minority fraction of a waste stream, and to allow the majority fraction to—continue forward. Thus, in an embodiment, digital dielectric sensors are used where the majority of the waste stream is recoverable plastics. In such an arrangement, the sensor threshold is set for low pass operation, and the threshold is set for the maximum dielectric of the acceptable material. Thus, the materials having a higher dielectric constant, typically wood and rubber and high dielectric plastics, are rejected, or diverted, for other processing. On the other hand, in an embodiment intended to sort a materials stream where the majority fraction is waste wood, rubber and high dielectric plastics, an analog sensor bed can be used. In such an arrangement, the sensor threshold is set to reject a range of dielectric constants which encompasses all of the desired plastics. The plastics, which comprise the minority fraction, are then rejected and redirected for further processing. In some embodiments, a combination of sensors may be used, or a bed having both types of sensors can be implemented, where only one type of sensor is sensed for a particular stream of materials. It will be appreciated that, while the foregoing discussion suggests the use of analog sensors for one arrangement and digital sensors for another, in fact either type of sensor can be used for either low pass or high pass operation, and the choice is largely an implementation preference. Thus, for each example given herein, it will be appreciated that the complementary arrangements, both as to sensor and which materials fraction is selected or diverted, are also possible and are not explicitly disclosed for purposes of brevity.

To enhance the dielectric contrast of absorbent materials such as wood, paper, cardboard, carpet, and so on, these mixed materials may pass through a humidifier 520 to moisten the exposed surfaces. In some instances, the moisture content is excessive, and the materials can be flash dried with an IR heat source. As previously noted, maintenance of a substantially constant temperature and humidity at this stage can provide more uniform performance, and so in some embodiments these stages of the separation system are enclosed by, for example, refrigeration plastic panels so that the interior area can be thermally conditioned.

The low pass dielectric separation module 225 can include one or more conveyor belts 525A-525B, as well as air jet arrays 530A-530B, where typically a conveyor belt is associated with each dielectric bed and at least one air jet array is associated with each dielectric bed. The dielectric sensor arrays 515A-B may be set to detect materials that have a dielectric constant greater than 3.0-5.0. As the mixed materials travel over the first stage conveyor belt 151 they travel in close proximity to the dielectric sensor array 515A that detects the materials that have a dielectric constant greater than the set value. When a high dielectric item is detected, a signal is transmitted to the associated air jet array 530A which emits a blast of compressed air to deflect the trajectory of the high dielectric material as it falls off the end of the first conveyor belt 525A onto a second conveyor belt 535 that takes the diverted material away to a take-away conveyor 540 for secondary processing. If the materials pass through the dielectric sensor array 515A, and thus are assumed to have a low dielectric constant, they are not deflected by the air jet array 156 and continue on through the separation process.

In an optional arrangement, the materials that are not diverted by the first digital capacitive dielectric sensor array 154 are cascaded onto a conveyor belt 525B and transported over a second dielectric sensor array 515B, to identify and select any materials that were missed by the first array. The dielectric settings of the first and second digital capacitive sensor arrays 515A-515B may be approximately equal or, alternatively, the second sensor array may be set to a different dielectric threshold. For the example of a low pass array, materials that have a dielectric constant above the set point of the second sensor array are deflected by a second air jet array 530B and diverted to the take-away conveyor belt 540. The materials on the take-away conveyor belt 540 may be transported for further processing as discussed elsewhere in this Specification. It will be appreciated that, while the foregoing description assumes that materials having a high dielectric constant will be diverted from the main path for further processing as desired, and low dielectric materials will continue, it is also possible to reverse that process, such that materials having a low dielectric constant are diverted for other processing, and those having a higher dielectric constant continue. Thus, which materials are processed where is not a significant aspect of the invention; the objective is to process any of the materials that are desired for a particular implementation.

Capacitive Proximity Sensors

The sorting process of the present invention includes a material identification step and a physical sorting step. In the past it has been very difficult to differentiate the rubber, wood and plastic because all have very similar atomic numbers and specific gravities. It has been discovered that, when implemented properly, dielectric constant can be used to reliably distinguish these materials.

In the arrangement of the present invention, for example in the sensor arrays 515A-B, capacitive dielectric sensors are used to identify the different material composition of each piece and to send a signal to a sorting mechanism that separates the different materials along different paths. The dielectric constants for all materials ranges from about 1.0 for materials such as air to 80.0 for water. Capacitive proximity sensors are good at detecting waste materials that have comparatively high dielectric constants. For example, some known dielectric constants for common waste materials are listed below in Table 1.

TABLE 1

| Material | Polyethylene | Polystyrene | Polypropylene | Dry Wood | Wet Wood | Rubber |
| --- | --- | --- | --- | --- | --- | --- |
| Dielectric Constant | 2.3 | 3.0 | 2.0-2.33 | 2-7 | 10-30 | 2.5-3.5 |

As illustrated above, the non-plastic materials tend to have significantly higher dielectric constants, especially when wet. It is interesting to note that dry wood has a dielectric constant of 2-7, and rubber 2.5-35, and wet wood has a dielectric constant of 10-30. By adding moisture to the absorbent materials, a dielectric sensor bed is able to separate out nearly all of the non-plastic materials except certain rubbers having low dielectric constants. In addition, statistically, the vast majority of wood and rubber materials fall within a relatively narrow range of dielectric constants. For example, most rubber waste materials fall within a narrower range of 15-20. Thus, there is a distinct difference in the dielectric constant of plastics versus wood and rubber. As a result, capacitive proximity sensors can be effective at detecting materials within the mix that are not plastics.

Capacitive proximity sensors typically include a probe, an oscillator, a rectifier filter and an output circuit. The capacitive proximity sensor detects the dielectric constant of the pieces passing nearby by generating an electrostatic field and detecting the changes in this field when the pieces pass by the face of the sensor. When a high dielectric piece is not detected, the oscillator is inactive, and when a high dielectric piece is detected, it can be diverted as discussed above in connection with FIG. 5.

Different types of capacitive proximity detectors are available which have specific operating characteristics. In particular, shielded capacitive proximity detectors are best suited for sensing comparatively low dielectric constant materials due to a more concentrated electrostatic field. The electrostatic field of an unshielded capacitive proximity detectors is less concentrated which makes them more suitable for sensing comparatively high dielectric constant materials. However, for streams where the small particles and waste have been removed, unshielded dielectrics have proven adequate. Which dielectric sensor is appropriate will depend at least in part upon the particular implementation and the waste stream to be processed.

Capacitive proximity sensors are also available with both digital and analog outputs. While either type can be used in the present invention, depending upon the implementation, digital capacitive proximity sensors offer the ability to distinguish materials having dielectric values above or below a set point, or threshold. For example, a digital capacitive sensor can distinguish materials above or below a dielectric constant of 3.0 or other suitable set point. Most capacitive proximity sensors have a digital output that can be fed directly to a data acquisition system of a computer. These digital capacitive sensors are used in the low pass dielectric separation module 225 in FIG. 2A.

In contrast, an analog capacitive proximity sensor can be used to detect a more narrow range of dielectric constants. For example, some analog capacitive proximity sensors can detect materials that have a dielectric constant between 2.5 to 3.0. These analog capacitive sensors are used in the analog dielectric sensor module 245 shown in FIG. 2C. The analog capacitive proximity sensors have an analog output which can span a range of output currents or voltages. In an embodiment, the analog output current may be 4-20 mA or the output voltage may be 0-10V. These current or voltage signals are proportional to the dielectric constant of the material. The analog signals are processed by analog to digital converters and the digital signals are then fed to the data processing computer. Most stock capacitive proximity sensors are able to detect a wide range of dielectric constants thereby distinguishing low dielectric plastic from high dielectric rubber. Although this wide range of dielectric constants is useful for general sorting of mixed materials it is not as useful for sorting materials that have only small variations in dielectric constants.

Because the inventive system can be used to distinguish materials having a narrow range of dielectric constants, in some embodiments it may be desirable to use capacitive proximity sensor having a limited detection range to more easily facilitate distinguishing materials having similar dielectric constants. In other embodiments, the analog capacitive proximity sensors may have an extended or amplified range of sensitivity over a narrower range of dielectric constants.

For systems built in accordance with the present invention that are used to distinguish materials having modestly different dielectric constants, performance can, for some embodiments, be improved with capacitive proximity sensors that have a high sensitivity. Although the sensitivity of a sensor is built into the device, it is also possible to alter and improve the sensitivity based upon the housing and other factors. In an embodiment, the sensors are mounted into a machined piece of the slide or in a wear plate mounted under a conveyor belt. The sensors can, for example, be placed in a counter-bored hole under the upper surface of the slide or wear plate. The sensitivity of the sensor may be altered by the slide or wear plate material and its thickness, the diameter of the counter bored hole and the depth of the hole. By adjusting these variables, the capacitive proximity sensors can be "tuned" for optimum performance for the specific material detection application.

The operating frequency of the sensor corresponds to the detection time required to correctly detect the material selected for diversion, and thus affects operational speed. A faster operating frequency will be able to detect the selected objects more quickly than a detector with a slower operating frequency. The resolution corresponds to the size of the object being detected. A detector having a larger resolution is more suitable for detecting large objects than a detector having a smaller resolution.

Although capacitive proximity detectors can detect the presence of various types of wood and rubbers, this ability can vary depending upon the sensor and the type of material being detected. The distinction in sensitivity to specific types of wood and rubbers can be described in various ways. One example of the variation in sensitivity based upon the type of material being detected is the correction factor. Capacitive proximity sensors typically have "correction factors" which quantifies the relative penetration distance for various materials. By knowing the base penetration distance and the correction factor of the material being detected, the penetration distance for any wood and rubber being detected can be determined.

In order to accurately detect the pieces of the selected material mixed in with other materials, the detectors must be placed in close proximity to determine the material of the piece being inspected. This can be done by distributing the mixed pieces on a surface in a manner that the pieces are not stacked on top of each other and ensuring that there is some space between the pieces. The batch of mixed materials can be moved under one or more detectors or alternatively the pieces can be moved over the detector(s). The detection is based upon the size and material of the wood and rubber.

The belts and slides used in the present invention can be made of various materials. In some instances, it is desirable to select materials for the belts and slides which have dielectric constants outside the range of the materials being detected, since, if the dielectric constant of the belt or slide is too close to the dielectric constant material, the material can be harder to detect. For example, if wood and rubber pieces—which have comparatively high dielectric constants—are being detected, then a belt or slide of urethane, which has a very low dielectric constant, can be used since it outside the range of wood and rubber. However, detecting certain plastics with this arrangement could be difficult since urethane has about the same dielectric constant as some of the plastics being sorted.

In a alternative arrangement, the conveyor belt or slide can, for example, be made of a material that has a dielectric constant that is about 7-8 which is between the lower dielectric constant plastics and the higher rubber and wood values. In this embodiment the capacitive proximity sensors will be able to easily detect the dielectric constants of the plastic, wood and rubber pieces. This offers the benefit of permitting detection of even the different types of plastics, which may have different values in the marketplace.

The inventive system may be "tuned" in various ways for optimum results based upon configuration of the sensors in the system. By altering the variables associated with capacitive proximity sensors, the system can be tuned to the particular application between performed. These variables include: the depth and diameter of the mounting hole, the material used to mount the sensors and the type of capacitive proximity sensor being used. As one step, the tuning may be implemented by using different materials for the slide and/or conveyor belt, as discussed above. The plate material used to mount the sensors can also alter the sensitivity of the capacitive proximity sensors. Also, different positions of the sensors in relation to the slide and/or conveyor belt will influence the sensitivity and operation of the system. In an embodiment the mixed material pieces are placed on a moving conveyor belt and the capacitive proximity sensors are mounted in a wear plate that contacts the lower surface of the conveyor belt. Thus, mixed material pieces that are resting on the top of the conveyor belt are separated from the wear plate by the thickness of the conveyor belt. In an embodiment, the wear plate may be made of acrylic and the capacitive proximity sensors are mounted in counter sunk holes in the acrylic. The depth of the capacitive proximity sensors may vary depending upon their sensitivity. If sensors of different types or sensitivities are used in a particular sensor array, as may be desirable in some embodiments, different hole depths may be used for the different sensors.

The placement of the sensors away from the surface that supports the mixed pieces will vary depending upon the range of the capacitive proximity sensor and the desired operation of the system. It may be desirable to have a sensor that has a range of 30 mm or more because this added range provides more resolution to differentiate the different materials. Thus, a sensor with a longer range will be placed deeper under the surface. With sensors of greater sensitivity, it is possible to reliably differentiate between materials that have similar dielectric properties, which can permit the system of the present invention to distinguish and separate different grades of similar materials such as: polyethylene, polystyrene and polypropylene which each have a slightly different dielectric constant.

The sensitivity of the sensors can impact the accuracy of the sorting system in at least some embodiments, particularly where the materials to be sorted include materials with very similar dielectric constants. However, more sensitive sensors typically are more expensive and may not be required for a particular implementation. As a result, the designer of a particular system will typically match the sensitivity of the sensor to the relevant factors associated with the particular mix and the materials used in the rest of the system.

Various methods may be used to improve the sensitivity of the capacitive proximity sensors. As discussed above, in some embodiments it is desirable to mount the capacitive proximity sensors in a slide or in a wear plate under the conveyor belt. In addition, the mounting configuration itself can enhance the sensitivity of the capacitive proximity sensors. As one example, if the capacitive proximity sensors are mounted in a solid block of material that has a dielectric constant similar to the materials being sorted, it may enhance the detection of materials that are directly above the hole in which the sensor is mounted, even though the dielectric constant of the mounting material may limit peripheral detection of materials. Depending on the design, the sensor may be mounted within a sleeve or tube fabricated for a material with a specific dielectric constant, and the assembly then mounted in an appropriate location such as the wear plate. Sleeves or tubes of different dielectric constant materials can, in some instances, be selectively provided so that the material that produces the optimum sensitivity in the sensor can be used.

The geometry of the sensor holes may also affect the sensitivity of the capacitive proximity sensors. A larger hole may require more material to pass over in order to properly detect the dielectric constant, while a smaller hole may focus the electromagnetic detection and require less material volume to detect the dielectric constant.

The depth of the hole can also influence sensitivity, depending upon the other factors discussed above. In one embodiment, the system is configured to detect wood and rubber but not detect plastics. In this embodiment, the hole may be deep enough to exceed the range of the sensor for plastic materials. Because the wood and rubber have a higher dielectric constant and produce a stronger detection signal, the capacitive proximity sensors are still able to detect these materials.

In another embodiment, the system may be configured to detect and distinguish plastics, woods and rubbers. In this embodiment, a low sensitivity capacitive proximity sensor is mounted in a shallower hole than a high sensitivity capacitive proximity sensor to detect the plastic pieces. If different types of plastics are being sensed, a capacitive proximity sensor that has a very high sensitivity may be required.

In some embodiments, it may be desirable to use sensors which are narrowly tuned to a specific range, but which have improved ability to differentiate materials with similar dielectric constants. For example, as specified in Table 1 above, polypropylene plastic has a dielectric constant of 2.0-2.3, polyethylene has a dielectric constant of 2.3, and polystyrene has a dielectric constant of 3.0. A sensor with appropriate sensitivity can distinguish polystyrene from polypropylene and polyethylene to the extent the dielectric constants are different, for example, to the extent they do not overlap. Multiple rows or arrays of sensors can be used to add more precision.

An additional problem encountered with arrays of sensors as used in the present invention is crosstalk among the sensors. Cross talk is a condition in which detection signals intended to be detected by one sensor may affect other adjacent detectors. In general, the cross talk solutions discussed herein are applicable to the proximity sensors mentioned herein for most embodiments. With reference to FIGS. 6A-6E, various configurations of sensor arrays having different crosstalk and detection characteristics may be appreciated, with the objective of permitting a particular implementation to optimize the choice of array for the needs of that implementation. As shown in FIG. 6A, a number of detectors 610 may be arranged in a linear one dimensional array across a width of a slide or a conveyor belt 615 transporting the mixed material pieces, typically plastics pieces 620 and wood and rubber pieces 625. This configuration allows the wood and rubber pieces 625 to be detected by moving the mixed pieces across the row of detectors 610 which substantially speeds the wood and rubber detection process. If a conveyor belt being used, it is, in at least some embodiments, substantially horizontal or only slightly inclined. Alternatively, a slide can be used, in which case the angle may be 35 to 70+ degrees depending upon the types of materials being separated.

Because the typical detection range of the capacitive proximity sensors is short, they are typically positioned comparatively close to each other so that all wood and rubber pieces passing across the array of sensors are detected; the exact dimensions will vary with the detection range of the specific sensor used in each particular implementation. The sensors will preferably be arranged so that the wood and rubber pieces will not be able to pass between the sensors and thus avoid being detected while at the same time not placing the sensors so close together that crosstalk becomes an issue.

There are various methods for avoiding or minimizing cross talk while at the same time covering the entire width of the slide or conveyor belt. With reference to FIG. 6B particularly, the sensors 630 can be staggered such that the sensors are not positioned close to each other yet any wood and rubber piece on the slide or conveyor belt will pass close to at least one sensor. When using a staggered configuration, the sensors may be setup in multiple rows of sensors 630. By having more rows of sensors 630, the spacing between each sensor can be extended to avoid cross talk. In an embodiment, four or more staggered rows 635A-635D of sensors 630 may be used. By placing these sensors 630 in four or more staggered rows, the sensors are sufficiently spaced apart from each other as to avoid any cross talk.

Another means for avoiding cross talk is by using sensors having different operating frequencies. Cross talk typically occurs only between sensors operating at the same frequency. With reference to FIG. 6C, by placing sensors operating at different frequencies next to each other in the one dimensional array there is greater separation of same frequency sensors, while at the same time permitting the sensors to be spaced more closely, if desired for a particular implementation. If two different frequency sensors are used, an f1 detector 640 having a first frequency can be placed next to an f2 detector 645 having a second frequency. These detectors 640 and 645 can b arranged in an alternating pattern, either in straight or staggered rows. Further, if sensors of third, fourth, etc., frequencies are used, additional separation can be provided.

Figure 6D:
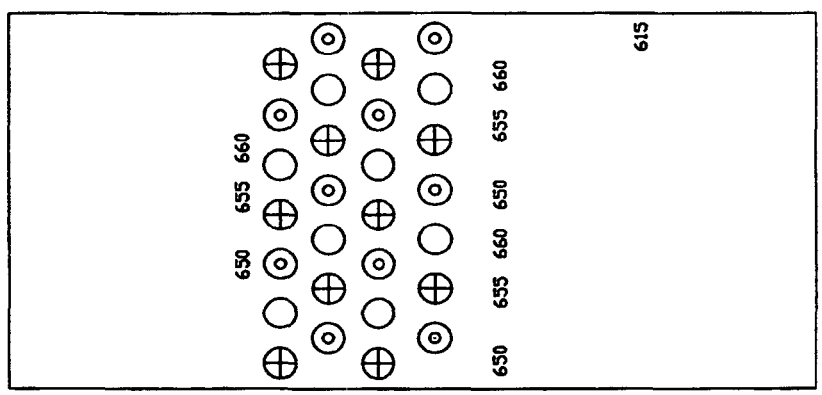
FIGS. 6A-6E show examples of alternative arrangements of proximity sensors for use with the inductive and dielectric sorting modules of the present invention, including arrangements which offer reduced crosstalk.
Figure 6C:
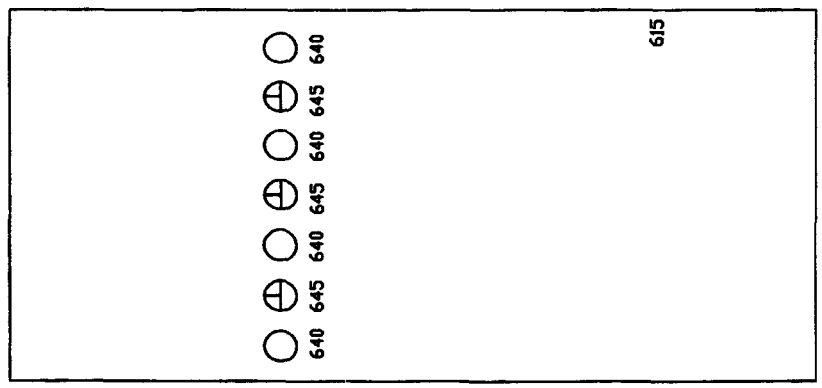
Figure 6B:
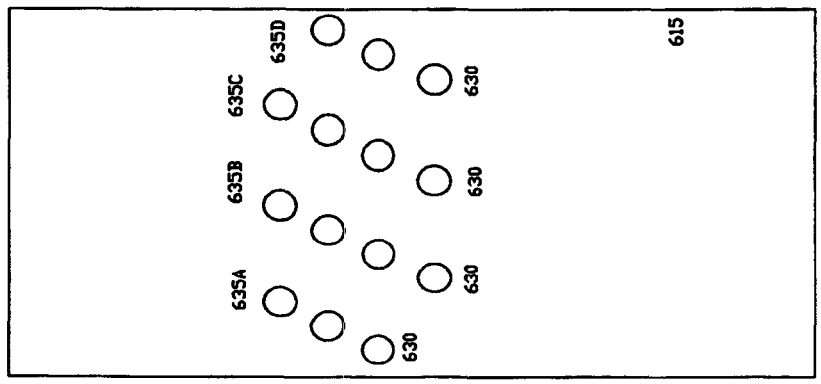
Figure 6A:
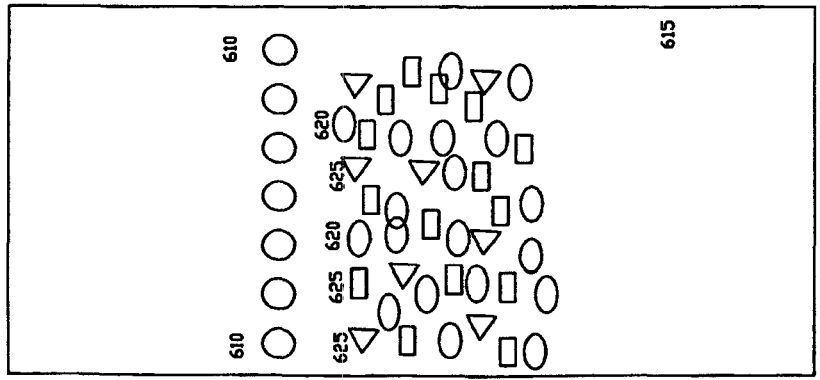

With reference to FIG. 6D, an arrangement can be seen which combines alternating of frequencies and separation of the sensors into one or more additional staggered rows of detectors. A first set of sensors 650 operates at a first frequency, a second set of sensors 655 operates at a second frequency, and a third set of sensors 660 operates at a third frequency. By using different frequencies and/or using multiple staggered rows of sensors, detectors 650, 655, 660 can be placed across the entire width of the inspection area without causing significant, if any, cross talk.

Figure 6E:
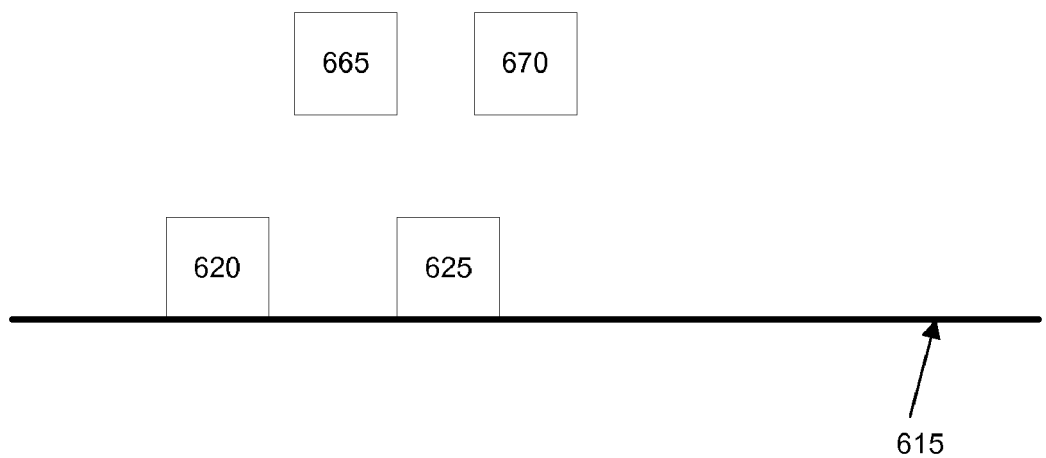

As discussed above, unshielded detectors can offer some advantages for detecting large pieces while shielded detectors can offer some advantages for detecting small pieces. Thus, the small and large wood and rubber pieces can be most efficiently sorted from the mixed materials by using both shielded and unshielded capacitive proximity sensors. With reference to FIG. 6E, a side view of an embodiment of the inventive sorting system is shown. In order to quickly and accurately detect all sizes of wood and rubber pieces, the mixed materials include plastic pieces 620 and wood/rubber pieces 625. The mixed materials 620, 625 pass in close proximity to at least one shielded sensor 665 and/or one unshielded sensor 670. As previously discussed, the conveyor belt should be suitable durable for industrial applications, and is preferably configured to permit the sensors to readily detect the materials passing near the sensor array positioned either under the belt, or above the belt, but without physical contact between the sensors and the material being sorted.

It will be appreciated by those skilled in the art that, at least sometimes, the pieces being sorted can become deformed and twisted, in which case they may offer only a small profile for detection by the sensors. In addition, in at least some instances the undesirable materials may be stacked above or below the desired materials, making detection more difficult. In such embodiments, an array of sensors both above the belt and below the belt can be used to improve the accuracy of detection. It will be appreciated that an upper array of sensors can be arranged in the same manner as the sensor bed below the belt, to minimize crosstalk and maximize detection. As discussed hereinafter, cascaded conveyors and multiple sensor arrays also assist in reducing "missed" materials, since the drop from one conveyor to another in the cascade is frequently sufficient to reposition a distorted or trapped piece, making it easier for the sensors to identify.

The inventive materials sorting system can use shielded capacitive proximity sensors 665, unshielded capacitive proximity sensors 670 or a combination of shielded and unshielded sensors 665, 670. In any of these configurations, all signals from the detectors 665, 670 are fed to a processing computer (not shown). Because the shielded sensors 665 and the unshielded sensors 670 are typically each better at identifying specific types of wood and rubber pieces 625, they may produce different detection signals for the same piece of wood, rubber or other material 625. Because shielded sensors 665 are better at detecting small pieces, they will produce a stronger detection signal for, for example, small wood and rubber pieces than an unshielded sensor 670. Similarly, the unshielded sensor 670 will produce a stronger detection signal for a larger pieces than the shielded sensor 665. In order to improve the accuracy of the materials identification process, the processing computer can execute a program which prioritizes which type of signal will be selected for a particular embodiment. For example the computer can execute an algorithm that uses the strongest detector signal to indicate the position of the detected piece 625. In this embodiment, the mixed pieces 620, 625 can be passed by several rows of sensors 665, 670 so that the selected pieces 625 are detected several times. The system will be more accurate because the position of the selected piece 625 will be tracked by the detectors 665, 670 and the strongest detection signal will provide the most accurate position information. It will be appreciated that the computer includes a mechanism, for example a look-up table, which permits the program to correlate sensor location with position, so that the physical position of any detected material can be identified and tracked over time.

Figure 7A:
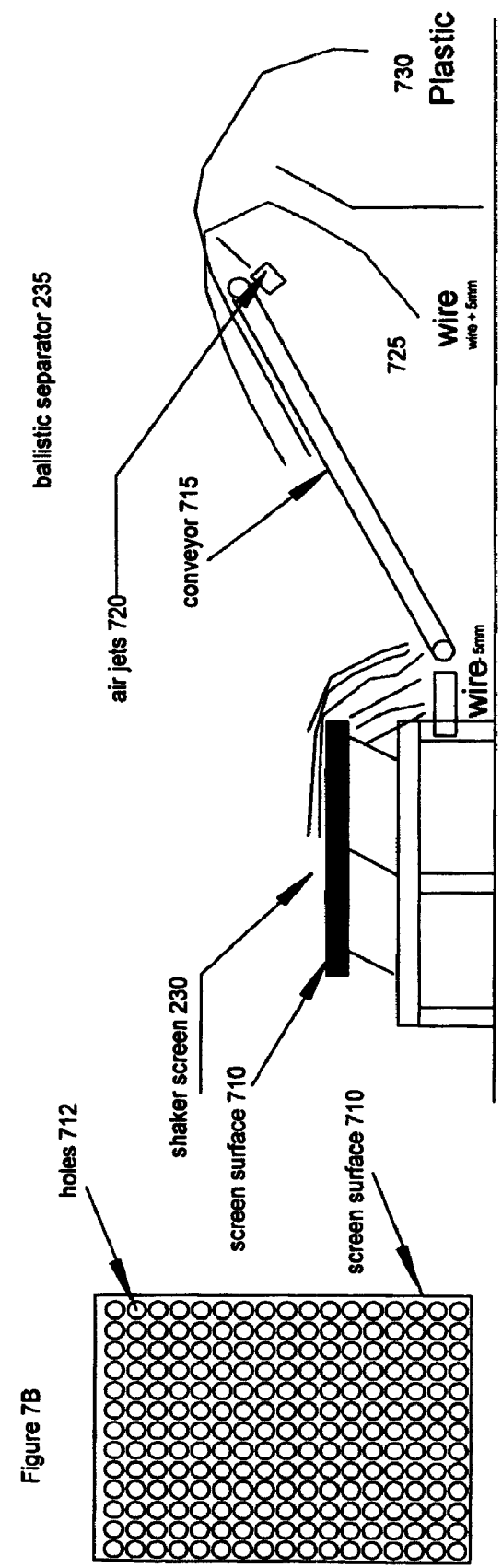
FIGS. 7A-7B illustrate in greater detail a ballistic separator module in accordance with the present invention.
Figure 7B:
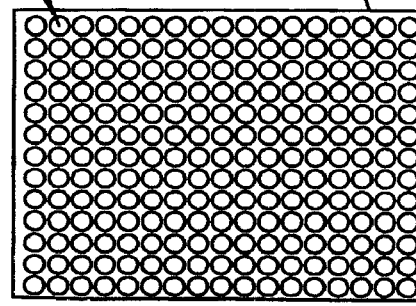

In an embodiment, the materials that pass through the low pass digital dielectric sensor array(s) 515A-515B are transported preferably by a transfer conveyor belt 255 to the next module, best seen in FIGS. 2B and 7. Initially, the material is passed to a shaker screen 230 that separates smaller sized pieces from larger materials. The shaker screen 230 has a screen surface 710 that is vibrated by a motor and supported by movable legs. The screen surface 710 includes an array of perforations or holes to allow smaller pieces to fall through the screen surface. The shaker screen 710 can be slightly declined so that the material travels to one end and falls into separate segregated areas 181. In one embodiment, the holes in the screen surface 171 can be on the order of 18 mm in diameter, however the size of the holes is typically matched to the material being sorted and thus can vary over a significant range. Larger holes will cause more pieces to fall through the shaker screen surface 171 and out of the continuing processing flow 181. The small pieces may include dirt and the large pieces may include wire and low dielectric plastics. Alternatively, the sink/float tank described in connection with FIG. 10 can be used to efficiently perform this separation function. When used for wire separation, the media of the float/sink tank may be water or water plus a compound to increase the specific gravity, or a heavy media system, or a sand float system.

In an embodiment, the larger pieces sorted by the shaker screen 710 are placed on a high speed ballistic conveyor belt 715 which separates larger plastic materials from smaller pieces that were not separated by the shaker screen 710. The high speed ballistic conveyor belt 715 is inclined upward and the materials on the high speed belt are accelerated and projected off the end of the belt 715 as a function of their density. For at least some embodiments, a belt speed on the order of 600 feet per minute has been found suitable, although the speed can vary with the materials mix being sorted. In some implementations, an array of air jets 720 mounted at the end of the belt 715 is used to project a constant low pressure stream of compressed air to help to separate the lower density materials out of the stream. The air jets 720 more readily divert lower density materials than the higher density materials since the mass of lower density materials is less, where the material pieces are approximately the same size. Thus, the lower density materials such as wire and dirt may be deflected to fall into a first segregated area 725, while the greater momentum of the higher density materials such as high density plastics gives them a trajectory that allows them to be projected farther away into a second segregated area 730.

There are various alternatives to the ballistic conveyor belt sorting method to separate plastic from wire. As one alternative, a specific gravity sorting method may be used. The specific gravity of plastic, wood, rubber and so on is typically about 1.4 while the specific gravity of wire and other metals is greater than about 2.5. If these pieces are placed in a fluid material with a known specific gravity (such as water, sand or a heavy media) the plastic and other materials will be made to float while the wire and other metals will be made to sink. Such an arrangement is described in greater detail in connection with FIG. 10, and it will be appreciated that the float/sink tank of FIG. 10 can also be used to separate lighter and heavier plastic fractions, by adjusting the specific gravity of the media. Other sorting methods that may be used include high definition metal detection, water bath and x-ray detection, as well as the heavy media system and sand float process described earlier. At this point, it will be appreciated that the material mix has been separated into its key components, and high density, low dielectric constant plastic has been separated from all other materials to a relatively high degree of accuracy, typically well above 90% and in at least some implementations more on the order of 99%. This yields a commercially attractive recyclable product.

It is also possible to further sort the materials which were diverted because they had a higher dielectric constant than was desired in the low pass sorting module 225, as briefly described in connection with FIG. 2C. With reference to FIGS. 8 and 9, these additional sorting steps may be better appreciated. In such an arrangement, the high dielectric materials that were separated by the lowpass dielectric sorting module 225 can be transported by a conveyor belt 540 to a shaker feeder 810 that is similar to the shaker feeder 260. The lower volume of high dielectric materials are fed by a conveyor belt which, in at least some arrangements, is permitted to travel at a slower speed than the original feed belt 310 and are the sorted by an bandwith sensor module 240. In at least some implementations, the bandwidth sensor module uses inductive sensors, the characteristics of which are discussed in greater detail hereinafter. The high dielectric materials pass by a high frequency inductive proximity sensors array 810 that separate metal pieces from the non-metal pieces. When the metal pieces are detected, a signal is sent to an array of air jets 193 deflect the metal pieces into a segregated area 195 by the use of software which maps and tracks the location of the items on the belt.

In some embodiments, a significant metal fraction may still remain. For such embodiments, in the arrangement of FIG. 8, bandwidth sensor array 240 detects non-ferrous metal pieces with inductive proximity detectors 830 used in the inductive sensor array 810.

Different types of inductive proximity detectors are available which have specific operating characteristics. In particular shielded and unshielded inductive proximity detectors perform the same operation of detecting metal but have distinct operating characteristics which are listed in Table 2.

TABLE 2

|  | Shielded Inductive Proximity Detector | Unshielded Inductive Proximity Detector |
| --- | --- | --- |
| Operating Frequency | ~100 Hz | ~300 Hz |
| Resolution | ~25 mm at 2.5 mps | ~8.325 mm at 2.5 mps |
| Penetration | 40 mm | 22 mm |
| Diameter | ~30 mm | ~30 mm |
| Detection Time | ~10 ms per cycle | ~3.33 ms per cycle |
| Belt Speed | 0 to 4 mps | 0 to 4 mps |

The operating frequency corresponds to the detection time and operating speed of the metal detection. A faster operating frequency will be able to detect metal objects more quickly than a detector with a slower operating frequency. The resolution correlates with the size of the object being detected. A detector having a larger resolution is more suitable for detecting large metal objects than a detector having a smaller resolution. The penetration refers to the maximum thickness of non-metallic material that can cover the metal object that the detector can penetrate and still properly detecting the underlying metal such as, for example, insulated or coated wires and metals or stacked plastic and metal pieces. A detector having a higher penetration depth will be able to penetrate the non-metallic material and detect more metal pieces than a detector having a lower penetration depth. In at least some arrangements, unshielded inductive proximity detectors may be preferred for detecting larger metal pieces while the shielded inductive proximity detectors may be preferred for detecting smaller metal pieces. Embodiments using the sizing steps described previously will reduce the need for such concerns in those arrangements.

The specifications in Table 1 are for typical 30 mm diameter inductive proximity detectors. Changing the diameter results in changed operating characteristics, and in particular, penetration distance can be lengthened by enlarging the diameter of the sensor. The larger detection area can also result in slower detection time and may be more susceptible to cross talk in some embodiments.

In addition to inductive proximity sensors that detect small and large pieces of metal, other inductive sensors offer somewhat different capabilities. For example, some coil based inductive proximity sensors are able to accurately detect non-ferrous metals such as aluminum, brass, zinc, magnesium, titanium, and copper. Depending upon the metal detection application, the material specific inductive proximity detectors can be used with the other sensors to detect large and small ferrous metal pieces and non-ferrous metal pieces. The non-ferrous metal detectors can be intermixed in the array of shielded and unshielded sensors or added as additional rows of non-ferrous metal detectors to the array, similar to the arrangements of capacitive sensors discussed previously. Although inductive proximity detectors can detect the presence of various types of metals, this ability can vary depending upon the sensor and the type of metal being detected in a manner known in the sensing art.

As with the capacitive sensors discussed previously, the inductive sensors of the module 240 in order to accurately detect the metal pieces mixed in with the non-metallic pieces, the detectors must be placed in close proximity to determine the material of the piece-being inspected. This can be done by moving one or more detectors over a batch of mixed materials or alternatively the pieces can be moved over the detector(s).

As discussed above, the unshielded sensors are slower than the shielded sensors and require more time to accurately detect the metal pieces. The detectors can be configured with multiple rows of shielded sensors and fewer rows of unshielded sensors. By having additional rows of shielded sensors, it is more likely that at least one of the several rows of shielded sensors will detect the metal pieces.

Once the non-ferrous metals have been separated out from the mix by the bandwidth sorting module 240, the residue is passed through to an analog dielectric sensor module 245. As with the prior sensor arrays, an array of analog dielectric sensors 910 can be positioned above or below a transport belt, or both above and below, and can be programmed to detect materials within a range of dielectric constants, as discussed previously. The analog dielectric sensor sortation device 245 separates high dielectric wood and rubber materials from plastic materials. In an embodiment where the majority fraction of the materials stream is waste, the sensor array 910 uses a group of analog dielectric sensors that may be set to a range of about 2.2 to 3.6 or other desired range. When materials are detected that have a dielectric value in the set range, such as the desired plastics which form the minority fraction of the stream, an air jet array 915 is actuated to reject the materials into a first segregated area 920 and the remaining materials—with a dielectric value outside of the desired range—pass through the dielectric sensor sortation device into a second separate segregated area 925. For example, high dielectric plastics have a dielectric constant in the range of 3.0 to 3.8, while wood and rubber materials have a dielectric constant above the 3.0 to 3.8 range, such that the analog sorting module 245 permits an effective automatic sort of wood and rubber from the desired plastics.

After the wood and rubber and plastic pieces are sorted, the sorted materials can be recycled. Although it is desirable to perfectly sort the mixed materials, there will always be some errors in the sorting process. These errors can be clue to the composition of the materials passing over the sensor, the location of the pieces being stacked on top of each other, an insufficient separation of the pieces, moisture, sensor errors, etc. The analog sorting algorithm may be adjusted based upon the strength of the analog detector signal output and environmental variables. An analog signal outside of the desired range is a strong indication of wood and rubber while a analog signal within the desired range is a strong indication of plastic. An algorithm sets a division of wood and rubber pieces from the plastic pieces based upon signal strength and can be adjusted, resulting in varying the sorting errors. The end user will be able to control the sorting point and may even use trial and error or empirical result data to optimize the sorting of the mixed materials.

Although the described sorting system for separating plastics from wood, rubber and other materials can have a very high accuracy of well over 90%, it is possible to improve upon this performance. There are various methods for improving the purity of the majority and minority fractions and accurately separating the wood and rubber from the plastics at an accuracy rate close to 100%, one of which involves the use of cascaded dielectrics. The separation of the majority and minority fractions sorted as described above can be further purified by further sorting the materials with a second primary sorting system and an additional recovery unit. The second primary unit and recovery units are both similar to the first primary wood and rubber sorting processing unit described above. The material sorted by the primary unit are placed onto a second conveyor belt and passed close by additional arrays of capacitive proximity detectors in the second primary sorting unit. These second primary sort and recovery unit detector arrays can be configured as described above: with mixed shielded and unshielded detectors, alternating operating frequencies for oscillator detectors, staggered rows for coil and/or oscillator detectors and arrays mounted both over and under the surface of the conveyor belt. The waste or mixed material from the second sort are forwarded to the recovery unit for a last sorting process.

Like the first primary sorting unit, the outputs of the capacitive proximity detectors in the second primary sort and recovery sort are fed to a computer which tracks the wood and rubber pieces. The computer transmits signals to the sorting mechanism to again separate the wood and rubber from the plastics. A high speed camera can be used with the sorting unit to more accurately detect the speed of the pieces. Lights may be necessary to improve the visible contrast of the pieces against the conveyor belt surface. Again, the wood and rubber pieces are deflected into different bins at the end of the slide or conveyor belt. In the preferred embodiment, the sorting system used with the recovery unit has air jets mounted under the upper surface of the slide or conveyor belt. The air jets are not actuated when the plastic pieces arrive at the end of the slide or conveyor belt and they fall into a plastics bin adjacent to the end of slide and the conveyor belt. The recovery computer sends signals actuating the air jets when wood and rubber pieces arrive at the end of the slide and conveyor belt deflecting them over a barrier into a wood and rubber bin. These under mounted air jets are preferred because the wood and rubber tends to be heavier and thus has more momentum to travel further to the wood and rubber bin than the lighter plastic pieces. The resulting accuracy of the pieces in the plastics bin of the recovery unit are up to 99+%.

It is estimated that a common yield from the described sorting process in an automobile and white good shredder recycling operation is 30-50% magnetic materials, 20-30% wood and rubber and 25-35% plastic and wire. The recovered magnetic materials may be pressed into pucks or briquettes that may be recycled in a molten furnace process to produce carbon steel alloys. The recovered wood and rubber may be used as filler for cement, feedstock fuel or carbon additives for steel alloy.

Separation Mechanisms

The sorting system of the present invention can be used with some or all of the sorting modules described above with respect to FIG. 1. When the pieces to be sorted are detected, the computer synchronizes the actuation of the air jet with the time that the wood or rubber piece reaches the end of the plastic slide or conveyor belt. Alternatively, a high speed digital camera can be used to track the location of the objects on the slide or conveyor belt and allow for accurate sorting. By separating the plastic and non-plastic pieces, the sorted plastic pieces can then be recycled. The plastic pieces may also be resorted to separate the different types of plastics. Although the inventive wood and rubber sorting system has been described with an array of air jets mounted over or under the slide or conveyor belt, it is contemplated that various other sorting mechanisms can be used. For example, an array of vacuum hoses may be positioned across the slide or conveyor belt and the computer may actuate a specific vacuum tube as the wood and rubber pieces pass under the corresponding hose. Alternatively, robotic arms with suction, adhesive, grasping, a powered finger or sweeping mechanisms may be used to remove the wood and rubber pieces as they move under a sorting region of the system.

Figure 10:
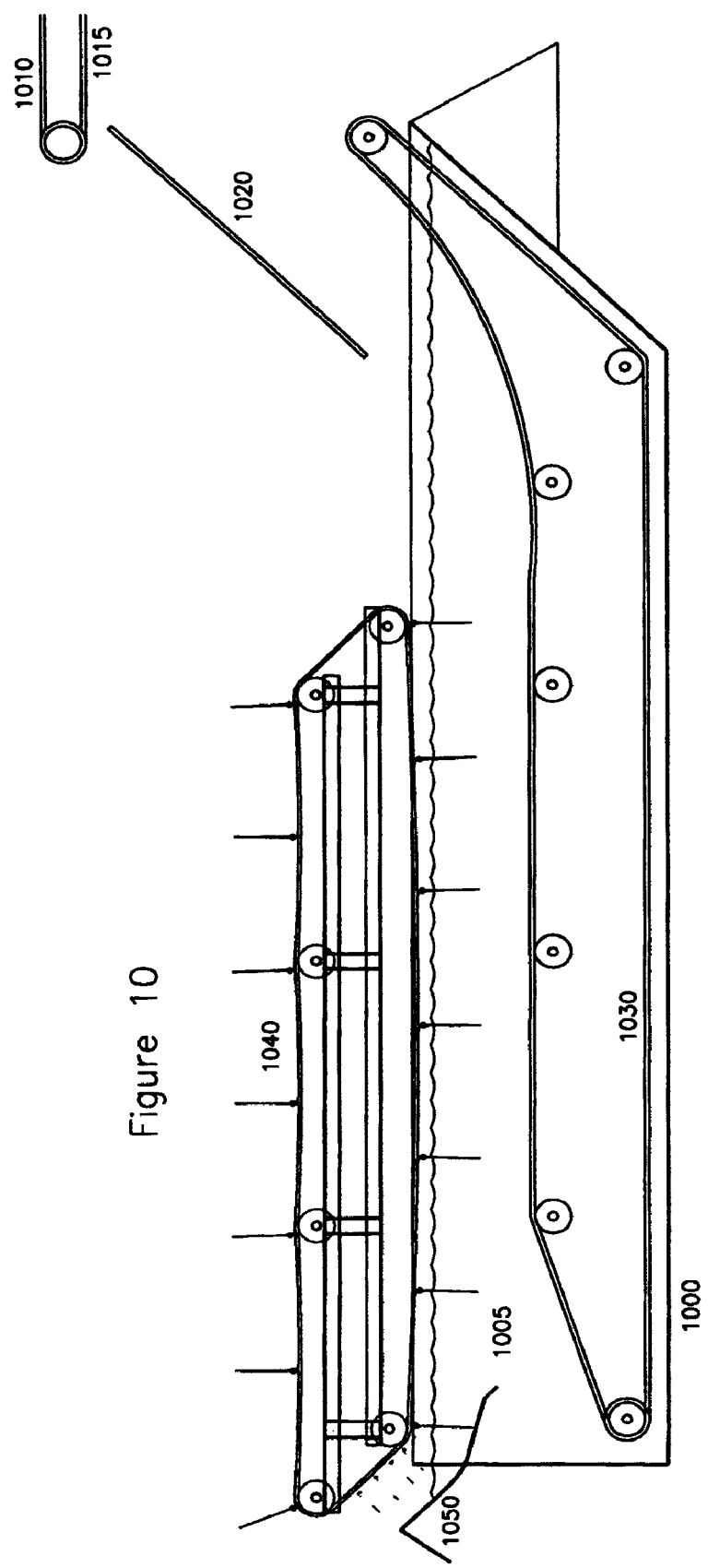
FIG. 10 illustrates an implementation of a float/sink tank in accordance with the present invention.

A further separation stage may be implemented in the manner shown in FIG. 10. FIG. 10 illustrates in cross-sectional side view a float/sink tank 1000, in which the media 1005 has a specific gravity which causes certain materials to sink, while other materials float. For example, as previously discussed, certain plastics float on water, while other sink. Thus, if water is used as the media, the float/sink tank 1000 can separate lower density plastics and other residual materials from higher density plastics. However, in accordance with the present invention, the specific gravity of the media 1005 may be selectively adjusted to permit separation of other materials, for example copper wire, from lighter materials such as plastics. For example, this approach also works for separation of insulated copper wire from plastic pieces, even where such insulation is typically plastic, by adjusting the specific gravity of the media to approximately 1.4, although the specific gravity may be higher or lower depending on the desired sorting. If water is the primary component of the media, the specific gravity of the media 1005 may be adjusted by adding salt, magnesium sulphite, and calcium chloride, or other suitable materials. In some embodiments, calcium chloride is presently preferred for adjusting the specific gravity of the water-based media. In other instances, the media will be a dry sand process or a heavy media process, as discussed elsewhere herein (See FIG. 1 B.) It will be appreciated by those skilled in the art that the present invention is not limited to either wet or dry process, nor any particular media, nor any specific material for adjusting the specific gravity of the media. It will also be appreciated that some embodiments will include a plurality of float/sink tanks, each having a media of a different specific gravity, to better sort specific materials such as different types of plastics. It is also possible to use a combination of a float/sink tank with a heavy media process, or a sand float process followed by either a float/sink process or a heavy media process.

During operation of an embodiment, a stream of recyclable materials 1010 is delivered to the float sink tank by any suitable means, for example a conveyor 1015 and a chute 1020. Where desired, the chute may have a fairly steep angle to allow the materials in the stream 1010 to sink promptly upon entering the media 1005. Those with a specific gravity less than the media will thereafter resurface, while those with a higher specific gravity will remain submerged. It will be appreciated that the chute 1020 is not necessary in all embodiments.

After the materials have separated in the media, the heavier materials will be at the bottom of the tank, while the lighter materials will be floating at the top. It will be desirable in at least some implementations to provide a mechanism for efficiently removing, separately, the two groups of materials. An example of such an arrangement is also shown in FIG. 10, wherein a drive mechanism 1030 is positioned along the bottom of the tank to move the heavier materials toward the proximal end of the tank, while a series of paddle wheels 1040 are positioned along the length of the surface of the media to move the lighter materials toward the distal end of the tank. It will be appreciated that the materials could be removed from either end, and the decision of where the materials will be removed from the tank is merely an implementation detail. The two separate groups of materials may then be removed by any suitable means. Suitable drive mechanisms for the bottom can include a drive screw with horizontally disposed slats or paddles which substantially span the width of the tank, or can include a drag chain having the slats or paddles attached thereto, or can include a submerged conveyor. The bottom of the tank can be flat is a drag chain or submerged conveyor is used. If a screw drive is used, it can be useful to provide a channel along the bottom of the tank into which the screw can be placed. It will be appreciated that a curved outlet 1050 may be provided for the removal of the surface material, where the paddles are sized to substantially meet the curved outlet, while at the same time having the chute long enough to permit the media to drain back into the tank rather than being sloshed out of the tank. The specific media depends substantially upon the type of material being handled.

Figure 4B:
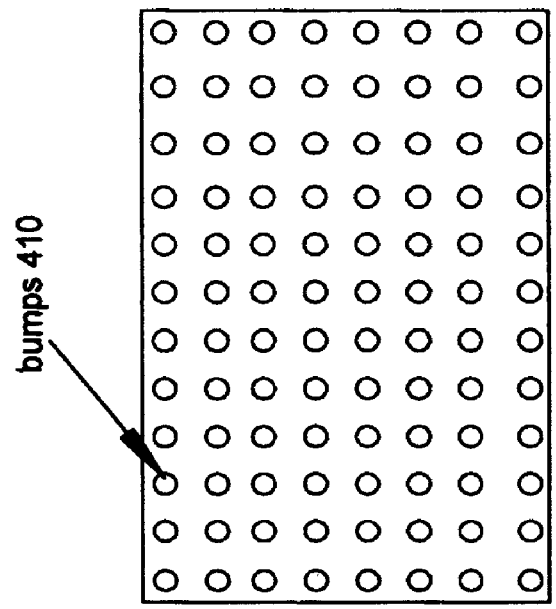
FIGS. 4A-4B show, in side elevational view and in top plan view, respectively, a rollback friction separator module in accordance with the present invention.
Figure 4A:
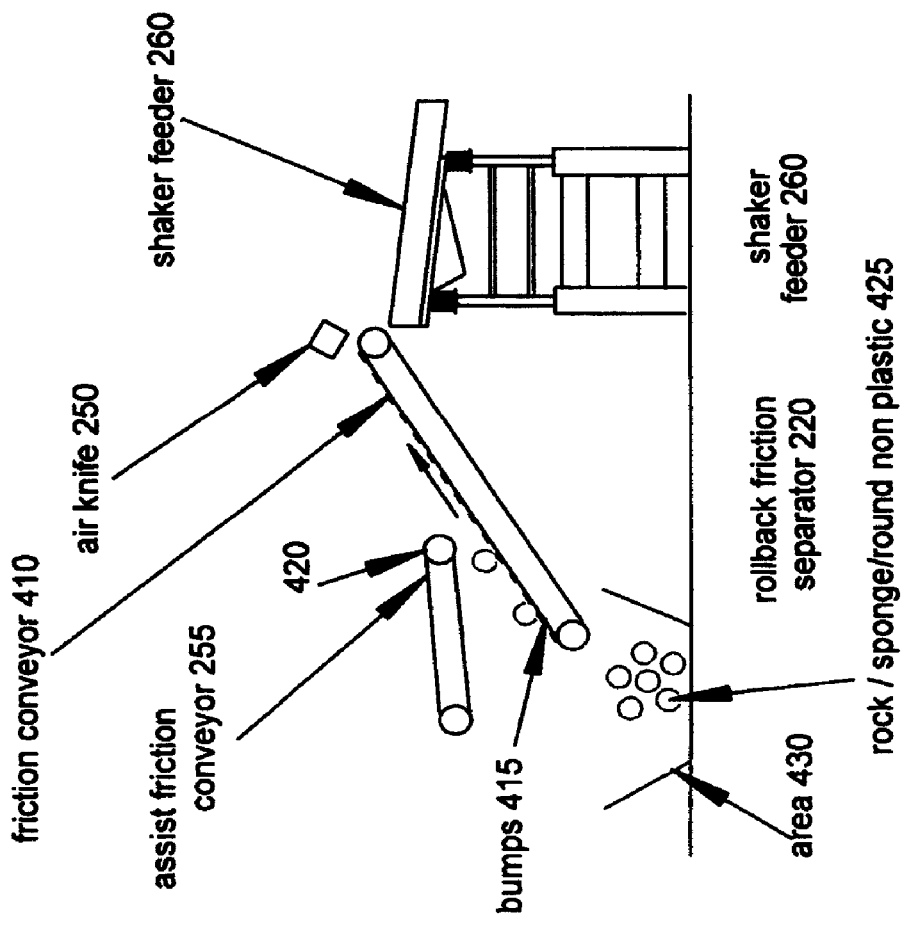

In an embodiment of the invention, it is possible to achieve a highly efficient recovery of wire from the stream of recyclable materials, through the use of an initial magnetic separation to separate out the ferrous materials, followed by an separation stage such as that shown in FIGS. 4A-4B to separate out a heavy fraction which typically includes rubber, wire and metals from a lighter fraction which typically includes plastics and foam. An air knife or other air system is typically implemented in such an arrangement to assist in separating the heavy fraction from the plastics and foam. The heavy fraction can then be separated into wire and rubber fractions by use of the float/sink tank described in FIG. 10, where the wire typically comprises the heavy fraction. If the heavy fraction include dirt and fine particles, a screening operation can be included prior to introducing the heavy fraction into the float/sink tank.

It will be understood that although the present invention has been described with reference to particular embodiments, additions, deletions and changes could be made to these embodiments, without departing from the scope of the present invention. Although a system has been described that includes very specific dielectric constant settings, it is well understood that these settings and the described configuration of sorting system units can be modified and rearranged in various other configurations.

What is claimed is:

1. A materials separation module, comprising:
   at least one array of dielectric sensors for detecting pieces of material having a dielectric constant outside a predetermined range;
   a feeder for supplying a stream of pieces of material of different dielectric constants into proximity of the at least one array;
   temperature and humidity controls which maintain substantially constant the temperature and humidity of the at least one array and the materials passing in proximity thereto;
   a tracking system for identifying and tracking the location of pieces of material identified by the at least one array; and
   a diverter which receives input from the tracking system and responds by diverting the identified pieces of material.

2. The materials separation module of claim 1, wherein the dielectric sensors comprise digital sensors.

3. The materials separation module of claim 1, wherein the dielectric sensors comprise analog sensors.

4. The materials separation module of claim 1, further including a mister for increasing a moisture content of absorbent pieces within the material.

5. The materials separation module of claim 1, wherein the predetermined range is established by a threshold.

6. The materials separation module of claim 1, wherein the predetermined range is above 3.4.

7. The materials separation module of claim 1, wherein the predetermined range is below 3.4.

8. The materials separation module of claim 1, wherein the predetermined range is 1.0-3.5.

9. The materials separation module of claim 1, wherein the at least one array is a plurality of arrays, and the feeder comprises a plurality of conveyors.

10. The materials separation module of claim 9, wherein the plurality of conveyors are cascaded and each conveyor is associated with a sensor array.

11. The materials separation module of claim 1, wherein the at least one array is below the stream of pieces of material.

12. The materials separation module of claim 1, wherein the at least one array is above the stream of pieces of material.

13. The materials separation module of claim 1, wherein the at least one array of dielectric sensors comprise capacitive sensors.

14. The materials separation module of claim 13, wherein the at least one array of dielectric sensors comprise shielded and unshielded sensors.

15. The materials separation module of claim 13, wherein the at least one array of dielectric sensors comprise a first sensor adjacent to a second sensor and the first sensor operates at a frequency different from the frequency of the second sensor.

16. The materials separation module of claim 13, wherein the at least one array of dielectric sensors comprise at least two arrays and at least one array is below the stream of pieces of material and at least one array is above the stream of pieces of material.

17. The materials separation module of claim 1, wherein the at least one array of dielectric sensors comprise inductive sensors.

18. The materials separation module of claim 17, wherein the at least one array of dielectric sensors comprise shielded and unshielded sensors.

19. The materials separation module of claim 17, wherein the at least one array of dielectric sensors comprise a first sensor adjacent to a second sensor and the first sensor operates at a frequency different from the frequency of the second sensor.

20. The materials separation module of claim 17, wherein the at least one array of dielectric sensors comprise at least two arrays and at least one array is below the stream of pieces of material and at least one array is above the stream of pieces of material.

* * * * *